US009794916B2

(12) United States Patent
Beluri et al.

(10) Patent No.: US 9,794,916 B2
(45) **Date of Patent: *Oct. 17, 2017**

(54) DATA AND CONTROL MULTIPLEXING FOR UPLINK MIMO WITH CARRIER AGGREGATION AND CLUSTERED-DFT

(71) Applicant: INTERDIGITAL PATENT HOLDINGS, INC., Wilmington, DE (US)

(72) Inventors: Mihaela C. Beluri, Jericho, NY (US); Guodong Zhang, Syosset, NY (US); Philip J. Pietraski, Jericho, NY (US); Sung-Hyuk Shin, Northvale, NJ (US); Erdem Bala, Farmingdale, NY (US); Kyle Jung-Lin Pan, Saint James, NY (US); Chang-Soo Koo, Melville, NY (US); Janet A. Stern-Berkowitz, Little Neck, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 105 days.

This patent is subject to a terminal disclaimer.

(21) Appl. No.: 14/622,343

(22) Filed: Feb. 13, 2015

(65) Prior Publication Data

US 2015/0156770 A1 Jun. 4, 2015

Related U.S. Application Data

(63) Continuation of application No. 12/725,215, filed on Mar. 16, 2010, now Pat. No. 8,958,494.

(Continued)

(51) Int. Cl.

*H04W 72/04* (2009.01)
*H04B 7/04* (2017.01)

(Continued)

(52) U.S. Cl.

CPC ...... *H04W 72/0413* (2013.01); *H04B 7/0417* (2013.01); *H04B 7/0486* (2013.01);

(Continued)

(58) Field of Classification Search

None

See application file for complete search history.

(56) References Cited

U.S. PATENT DOCUMENTS 8,031,583 B2 10/2011 Classon et al.
8,200,252 B2 6/2012 Lee et al.

(Continued)

FOREIGN PATENT DOCUMENTS

EP 1 936 851 6/2008
EP 1 983 698 10/2010

(Continued)

OTHER PUBLICATIONS

Samsung et al., "Multiplexing of Rank and CQI/PMI in PUSCH Channel," 3GPP TSG-RAN Working Group 1 #53, R1-081732, Kansas City, U.S.A. (May 5-9, 2008).

(Continued)

*Primary Examiner* — Ayaz Sheikh
*Assistant Examiner* — Tarell Hampton
(74) *Attorney, Agent, or Firm* — Volpe and Koenig, P.C.

(57) ABSTRACT

A method and apparatus for signal processing in a wireless transmit receive unit (WTRU), including generating a plurality of data bits and a plurality of control bits, mapping the data bits and control bits to one or more codewords, multiplexing the data bits and control bits, dividing the bits into layers, allocating control bits to each layer based on a channel quality of each codeword and a channel quality of each layer, and channel interleaving each layer for output to one or more antennas.

20 Claims, 28 Drawing Sheets

Related U.S. Application Data

(60) Provisional application No. 61/160,594, filed on Mar. 16, 2009, provisional application No. 61/160,599, filed on Mar. 16, 2009, provisional application No. 61/304,376, filed on Feb. 12, 2010.

(51) Int. Cl.

| | |
|---|---|
| ***H04L 1/00*** | (2006.01) |
| ***H04B 7/0417*** | (2017.01) |
| ***H04L 1/18*** | (2006.01) |
| ***H04L 5/00*** | (2006.01) |
| ***H04L 25/03*** | (2006.01) |
| ***H04L 1/16*** | (2006.01) |
| *H04B 7/06* | (2006.01) |
| *H04W 88/08* | (2009.01) |

(52) U.S. Cl.

CPC .......... *H04L 1/0036* (2013.01); *H04L 1/1671* (2013.01); *H04L 1/1861* (2013.01); *H04L 5/006* (2013.01); *H04L 5/0023* (2013.01); *H04L 5/0037* (2013.01); *H04L 5/0053* (2013.01); *H04L 5/0055* (2013.01); *H04L 5/0057* (2013.01); *H04L 5/0064* (2013.01); *H04L 25/03343* (2013.01); *H04B 7/063* (2013.01); *H04B 7/0632* (2013.01); *H04B 7/0634* (2013.01); *H04B 7/0639* (2013.01); *H04B 7/0697* (2013.01); *H04L 1/0026* (2013.01); *H04L 1/0041* (2013.01); *H04L 2025/03414* (2013.01); *H04L 2025/03426* (2013.01); *H04L 2025/03802* (2013.01); *H04W 88/08* (2013.01)

(56) References Cited

U.S. PATENT DOCUMENTS

| | | | | |
|---|---|---|---|---|
| 8,379,750 | B2 | 2/2013 | Hoshino et al. | |
| 8,537,752 | B2 | 9/2013 | Dai et al. | |
| 8,934,848 | B2 | 1/2015 | Nishio et al. | |
| 2004/0058687 | A1 | 3/2004 | Kim et al. | |
| 2005/0100038 | A1 | 5/2005 | Pietraski et al. | |
| 2005/0281222 | A1 | 12/2005 | Ranta Aho et al. | |
| 2006/0280142 | A1 | 12/2006 | Damnjanovic et al. | |
| 2007/0183384 | A1 | 8/2007 | Kwak et al. | |
| 2007/0189151 | A1 | 8/2007 | Pan et al. | |
| 2008/0013610 | A1 | 1/2008 | Varadarajan et al. | |
| 2008/0043867 | A1 | 2/2008 | Blanz et al. | |
| 2008/0102846 | A1* | 5/2008 | Kim | H04W 72/085 455/450 |
| 2008/0192718 | A1 | 8/2008 | Jongren et al. | |
| 2009/0245190 | A1* | 10/2009 | Higuchi | H04L 47/10 370/329 |
| 2009/0262856 | A1 | 10/2009 | Onggosanusi et al. | |
| 2009/0285193 | A1 | 11/2009 | Kim et al. | |
| 2009/0303913 | A1 | 12/2009 | Yu et al. | |
| 2010/0054353 | A1 | 3/2010 | Roh et al. | |
| 2010/0067512 | A1 | 3/2010 | Nam et al. | |
| 2010/0195624 | A1* | 8/2010 | Zhang | H04L 1/1861 370/335 |
| 2010/0202561 | A1 | 8/2010 | Gorokhov et al. | |
| 2010/0208680 | A1 | 8/2010 | Nam et al. | |
| 2011/0081902 | A1 | 4/2011 | Seo et al. | |
| 2011/0128879 | A1 | 6/2011 | Cheon et al. | |
| 2011/0222483 | A1 | 9/2011 | Yuda et al. | |
| 2011/0255619 | A1 | 10/2011 | Nam et al. | |
| 2011/0274059 | A1 | 11/2011 | Brown et al. | |
| 2011/0299383 | A1 | 12/2011 | Ko et al. | |

FOREIGN PATENT DOCUMENTS

| | | | |
|---|---|---|---|
| WO | 2006/086359 | | 8/2006 |
| WO | 2008057843 | A2 | 5/2008 |
| WO | 2008154506 | A1 | 12/2008 |
| WO | 2009/020983 | | 2/2009 |
| WO | 2009/023730 | A2 | 2/2009 |
| WO | 2009018241 | A1 | 2/2009 |

OTHER PUBLICATIONS

Alcatel-Lucent et al., "Layer Mapping for UL SU-MIMO Spatial Multiplexing," 3GPP TSG RAN WG1 56, R1-091102, Athens, Greece (Feb. 9-13, 2009).

Asaeda et al., "PMIPv6 Extensions for Multicast," MULTIMOB Group, Internet-Draft (Jul. 13, 2009).

Gundavelli et al., "Proxy Mobile IPv6," Network Working Group, RFC 5213 (Aug. 2008).

LG Electronics, "Multi-layered Rate Control for Network MIMO in LTE-Advanced," 3GPP TSG RAN WG1 Meeting #56, R1-090658, Athens, Greece (Feb. 9-13, 2009).

Ericsson, "Uplink SU-MIMO in LTE-A," 3GPP TSG-RAN WG1 #54bis, R1-083751 (Sep. 29-Oct. 3, 2008).

Etri, "Uplink SU MIMO with simple layer interleaving," 3GPP TSG RAN WG1 Meeting #56, R1-090881 (Feb. 9-13, 2009).

Huawei, "Clarification of the transmission modes for channel quality information formats," 3GPP TSG-RAN-WG1 Meeting #55bis, R1-090112, Ljubljana, Slovenia (Jan. 12-16, 2009).

Huawei, "Discussion on RLF in DC-HSDPA," 3GPP TSG-RAN WG2 #63, R2-084402 (Aug. 2008).

Huawei, "RLF consideration in DC-HSDPA," 3GPP TSG-RAN WG2 Meeting #64, R2-086693 (Nov. 2008).

Nokia Siemens Networks et al., "Simulation Results: Linkage between PUSCH MCS and amount of resources for control on PUSCH," 3GPP TSG RAN WG1 Meeting #53, R1-081853 (May 2008).

Panasonic, "Offset between CQI and data MCS on PUSCH," 3GPP TSG-RAN WG1 Meeting #53, R1-081801, Kansas City, USA (May 5-9, 2008).

Qualcomm Europe, "Notion of Anchor Carrier in LTE-A," 3GPP TSG RAN WG1 #55bis, R1-080356 (Jan. 12-16, 2009).

Samsung et al., "Multiplexing of Rank and CQI/PMI in PUSCH Channel," 3GPP TSG-RAN Working Group 1 #53, R1-082087, Kansas City, USA (May 5-9, 2008).

Samsung, "On CQI/PMR/RI and Uplink Data Multiplexing," 3GPP TSG RAN WG1 Meeting #53bis, R1-082308, Warsaw, Poland (Jun. 30-Jul. 4, 2008).

Third Generation Partnership Project, "Technical Specification Group Radio Access Network; Evolved Universal Terrestrial Radio Access (E-UTRA); Multiplexing and Channel Coding (Release 8)," 3GPP TS 36.212 V8.5.0 (Dec. 2008).

Third Generation Partnership Project, "Technical Specification Group Radio Access Network; Evolved Universal Terrestrial Radio Access (E-UTRA); Multiplexing and Channel Coding (Release 8)," 3GPP TS 36.212 V8.8.0 (Dec. 2009).

Third Generation Partnership Project, "Technical Specification Group Radio Access Network; Evolved Universal Terrestrial Radio Access (E-UTRA); Multiplexing and Channel Coding (Release 9)," 3GPP TS 36.212 V9.0.0 (Dec. 2009).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.4.0 (Sep. 2008).

Third Generation Partnership Project, "Technical Specification Group Radio Access Network; Requirements for Further Advancements for E-UTRA (LTE-Advanced) (Release 8)," 3GPP TR 36.913 V8.0.0 (Jun. 2008).

Third Generation Partnership Project, "Technical Specification Group Radio Access Network; Requirements for further advancements for Evolved Universal Terrestrial Radio Access (E-UTRA) (LTE-Advanced) (Release 9)," 3GPP TR 36.913 V9.0.0 (Dec. 2009).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.5.0 (Dec. 2008).

(56) References Cited

OTHER PUBLICATIONS

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.212 V9.0.0 (Dec. 2009).
ZTE, "Remaining Issues with RI multiplexing on PUCCH," 3GPP TSG-RAN WG1 #54, R1-082836, Jeju, Korea (Aug. 18-22, 2008).
Ericsson, et al. "Corrections to CQI and RI fields description," 3GPP TSG-RAN WG1 #55bis, R1-090533, Ljubljana, Slovenia (Jan. 12-16, 2008).
Texas Instruments, "Layer Mapping Solution for Uplink SU-MIMO," 3GPP TSG-RAN WG1 #56, R1-090589, Athens, Greece (Feb. 9-13, 2009).
Third Generation Partnership Project, "Technical Specification Group Radio Access Network; Evolved Universal Terrestrial Radio Access (E-UTRA); Physical layer procedures (Release 8)," 3GPP TS 36.213 V8.5.0 (Dec. 2008).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.0.1 (Dec. 2009).
Third Generation Partnership Project, "Technical Specification Group Radio Access Network; Evolved Universal Terrestrial Radio Access (E-UTRA); LTE Physical Layer—General Description (Release 8)," 3GPP TS 36.201 V8.2.0 (Dec. 2008).
Third Generation Partnership Project, "Technical Specification Group Radio Access Network; Evolved Universal Terrestrial Radio Access (E-UTRA); LTE Physical Layer—General Description (Release 8)," 3GPP TS 36.201 V8.3.0 (Mar. 2009).
Third Generation Partnership Project, "Technical Specification Group Radio Access Network; Evolved Universal Terrestrial Radio Access (E-UTRA); LTE Physical Layer—General Description (Release 9)," 3GPP TS 36.201 V9.0.0 (Dec. 2009).

* cited by examiner

200

DATA AND CONTROL MULTIPLEXING FOR UPLINK MIMO WITH CARRIER AGGREGATION AND CLUSTERED-DFT

CROSS REFERENCE TO RELATED APPLICATION

This application is a continuation of U.S. patent application Ser. No. 12/725,215, filed Mar. 16, 2010, which claims the benefit of U.S. Provisional Application Nos. 61/160,594, filed Mar. 16, 2009, 61/160,599, filed Mar. 16, 2009, and 61/304,376, filed Feb. 12, 2010, which are incorporated by reference as if fully set forth herein.

FIELD OF INVENTION

This application is related to wireless communications.

BACKGROUND

Wireless communication systems may use many techniques to increase throughput and user services. One such technique is carrier aggregation. Another technique is support of flexible bandwidth. Yet another technique is to transmit both uplink data and control channels simultaneously. For example, in an advanced long term evolution (LTE-A) compliant system, uplink (UL) channels may be transmitted simultaneously, such as the physical uplink shared channel (PUSCH) and physical uplink control channel (PUCCH).

Other techniques include using multiple input/multiple output (MIMO) schemes, such as transmit diversity and spatial diversity, for example, in an UL communication. If MIMO is used in an UL communication, the processing of data bits and control bits may become complex.

SUMMARY

Disclosed is a method and apparatus for signal processing in a wireless transmit receive unit (WTRU). This may include generating a plurality of data bits and a plurality of control bits. The data bits and control bits may be mapped to one or more codewords. The data bits and control bits may be multiplexed. The data bits and control bits may be divided into layers. The control bits may be allocating to the layers based on a channel quality of each codeword and a channel quality of each layer. Each layer may be channel interleaved and output to one or more antennas.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Figure 1:
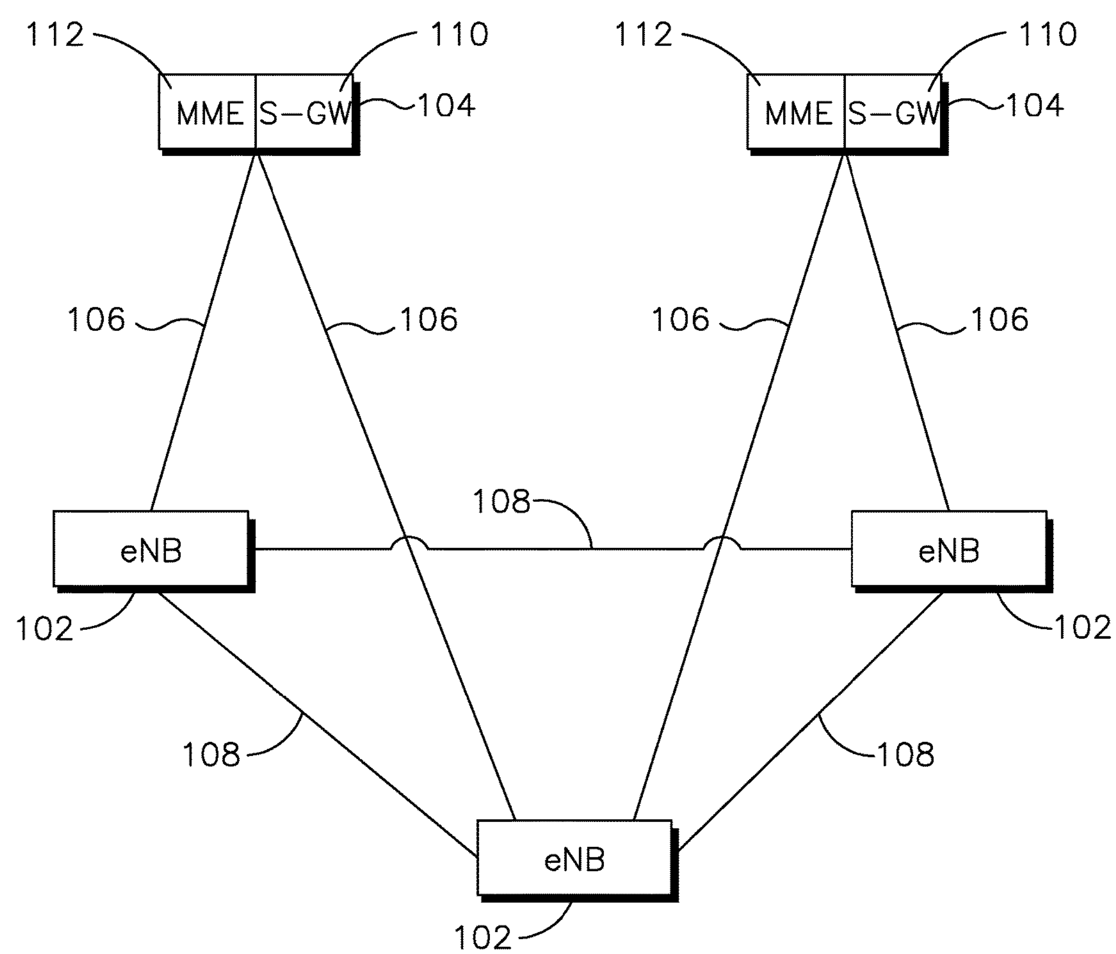
FIG. 1 shows an overview of an Evolved Universal Mobile Telecommunications System (UMTS) Terrestrial Radio Access Network (E-UTRAN)

FIG. 1 shows an overview of an Evolved Universal Mobile Telecommunications System (UMTS) Terrestrial Radio Access Network (E-UTRAN) 100 in accordance with the prior art. As shown in FIG. 1, E-UTRAN 100 includes three eNodeBs (eNBs) 102, however, any number of eNBs may be included in E-UTRAN 100. The eNBs 102 are interconnected by an X2 interface 108. The eNBs 102 are also connected by an S1 interface 106 to the Evolved Packet Core (EPC) 104. The EPC 104 includes a Mobility Management Entity (MME) 112 and a Serving Gateway (S-GW) 110. Other network configurations may be used, and nothing disclosed herein is limited to any one particular network configuration or architecture.

Figure 2:
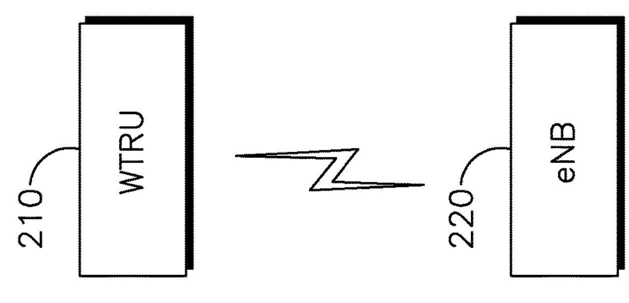
FIG. 2 shows a wireless communication system including a plurality of wireless transmit receive units (WTRUs) and an e Node B (eNB)
Figure 2:
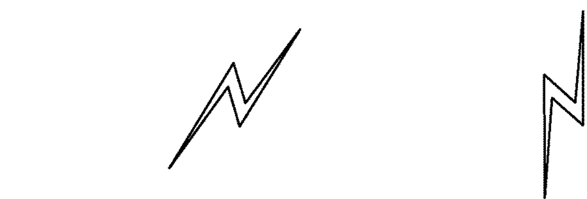
Figure 2:
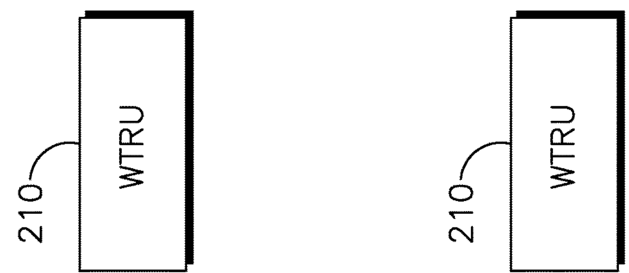

In a wireless communication system, a wireless transmit receive unit (WTRU) may communicate with an e Node-B (eNB). FIG. 2 shows a wireless communication system 200 including a plurality of WTRUs 210 and an eNB 220. As shown in FIG. 2, the WTRUs 210 are in communication with the eNB 220. Although three WTRUs 210 and one eNB 220 are shown in FIG. 2, it should be noted that any combination of wireless and wired devices may be included in the wireless communication system 200.

Figure 3:
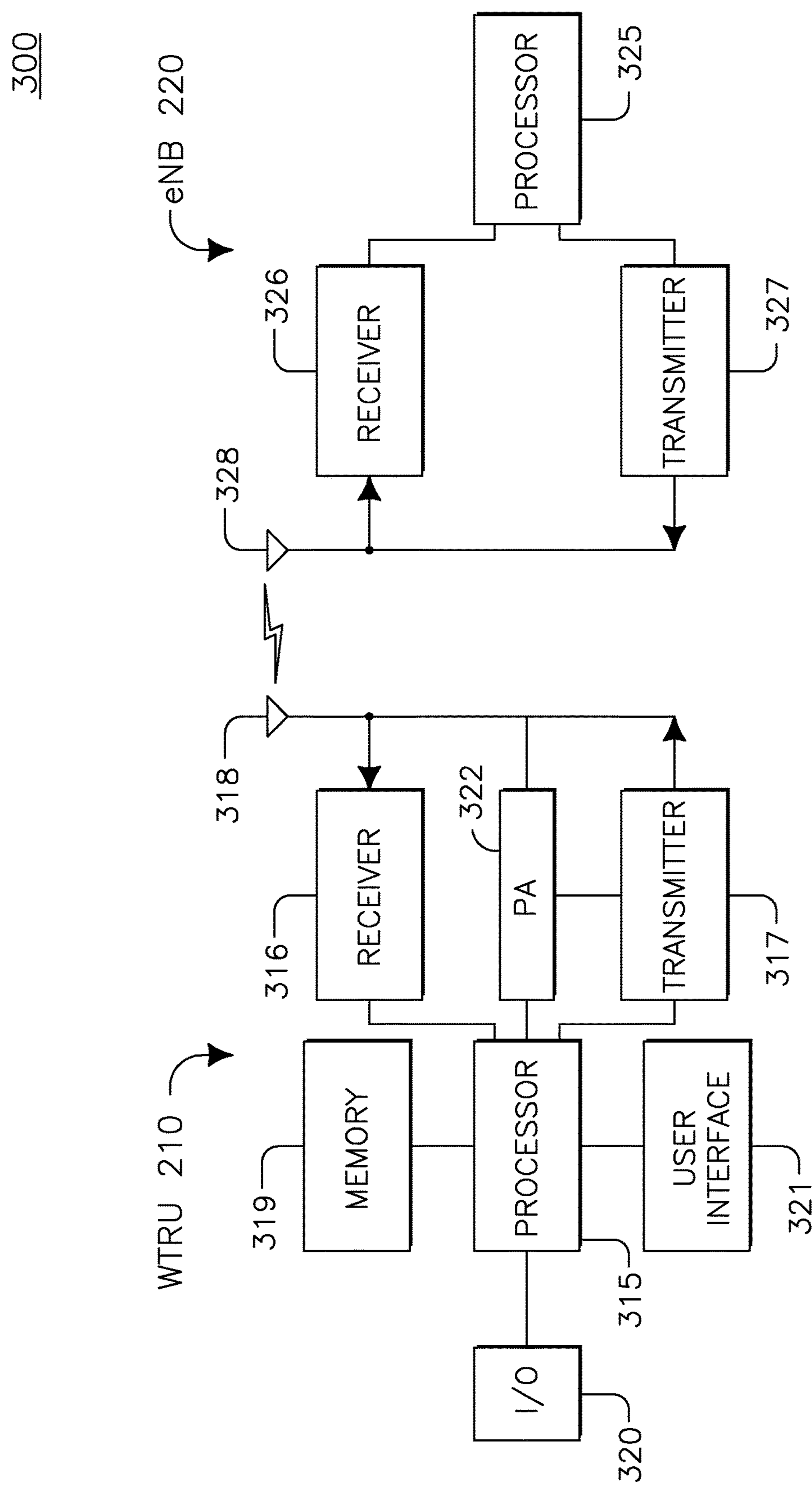
FIG. 3 is a functional block diagram of the WTRU and the eNB of the wireless communication system of FIG. 2.

FIG. 3 is a functional block diagram 300 of the WTRU 210 and the eNB 220 of the wireless communication system 200 of FIG. 2. As shown in FIG. 2, the WTRU 210 is in communication with the eNB 220. The WTRU 210 is configured to transmit and receive on a single carrier or on multiple carriers. The carriers may be contiguous or non-contiguous.

In addition to the components that may be found in a typical WTRU, the WTRU 210 includes a processor 315, a receiver 316, a transmitter 317, and an antenna module 318. The WTRU 210 may also include a user interface 321, which may include, but is not limited to, an LCD or LED screen, a touch screen, a keyboard, a stylus, or any other typical user interface device. The WTRU 210 may also include memory 319, both volatile and non-volatile as well as input/output interfaces 320 to other WTRUs, such as USB ports, serial ports and the like. The receiver 316 and the transmitter 317 are in communication with the processor 315. The antenna module 318 is in communication with both the receiver 316 and the transmitter 317 to facilitate the transmission and reception of wireless data. The antenna module 318 may include one or more antennas. The WTRU 210 may also include a power amplifier module 322 that is in communication with the processor 315 and transmitter 317. The power amplifier module 322 may include a single or multiple power amplifiers. The power amplifier module 322 may alternatively be located in the transmitter 317.

In addition to the components that may be found in a typical eNB, the eNB 220 includes a processor 325, a receiver 326, a transmitter 327, and an antenna module 328. The receiver 326 and the transmitter 327 are in communication with the processor 325. The antenna module 328 is in communication with both the receiver 326 and the transmitter 327 to facilitate the transmission and reception of wireless data. The antenna module 328 may include one or more multiple antennas.

Figure 4:
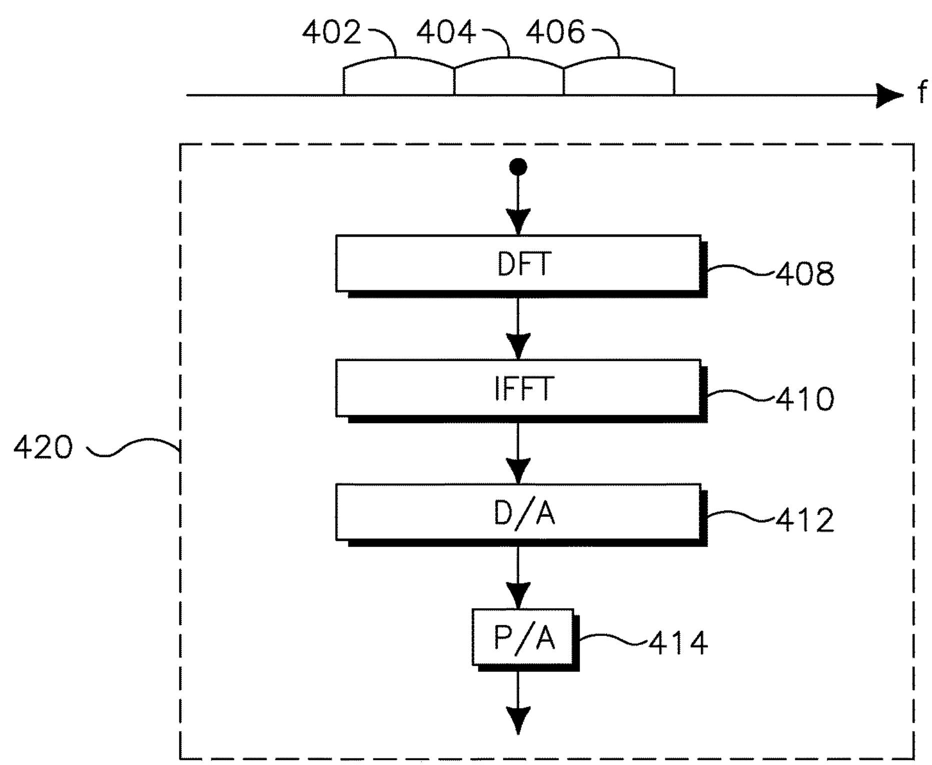
FIG. 4 shows an overview of a wireless communication system using carrier aggregation with contiguous carriers in accordance with an embodiment.

FIG. 4 shows an overview of carrier aggregation with contiguous carriers 400 in accordance with one embodiment. The individual carriers (402, 404, 406) may be aggregated to increase available bandwidth. Modulated data in each carrier (402, 404, 406) may be processed in a single WTRU 420 by a discrete Fourier transform (DFT) unit 408, an inverse fast Fourier transform (IFFT) unit 410, a digital to analog (D/A) converter unit 412 and a power amplifier (PA) unit 414.

Figure 5:
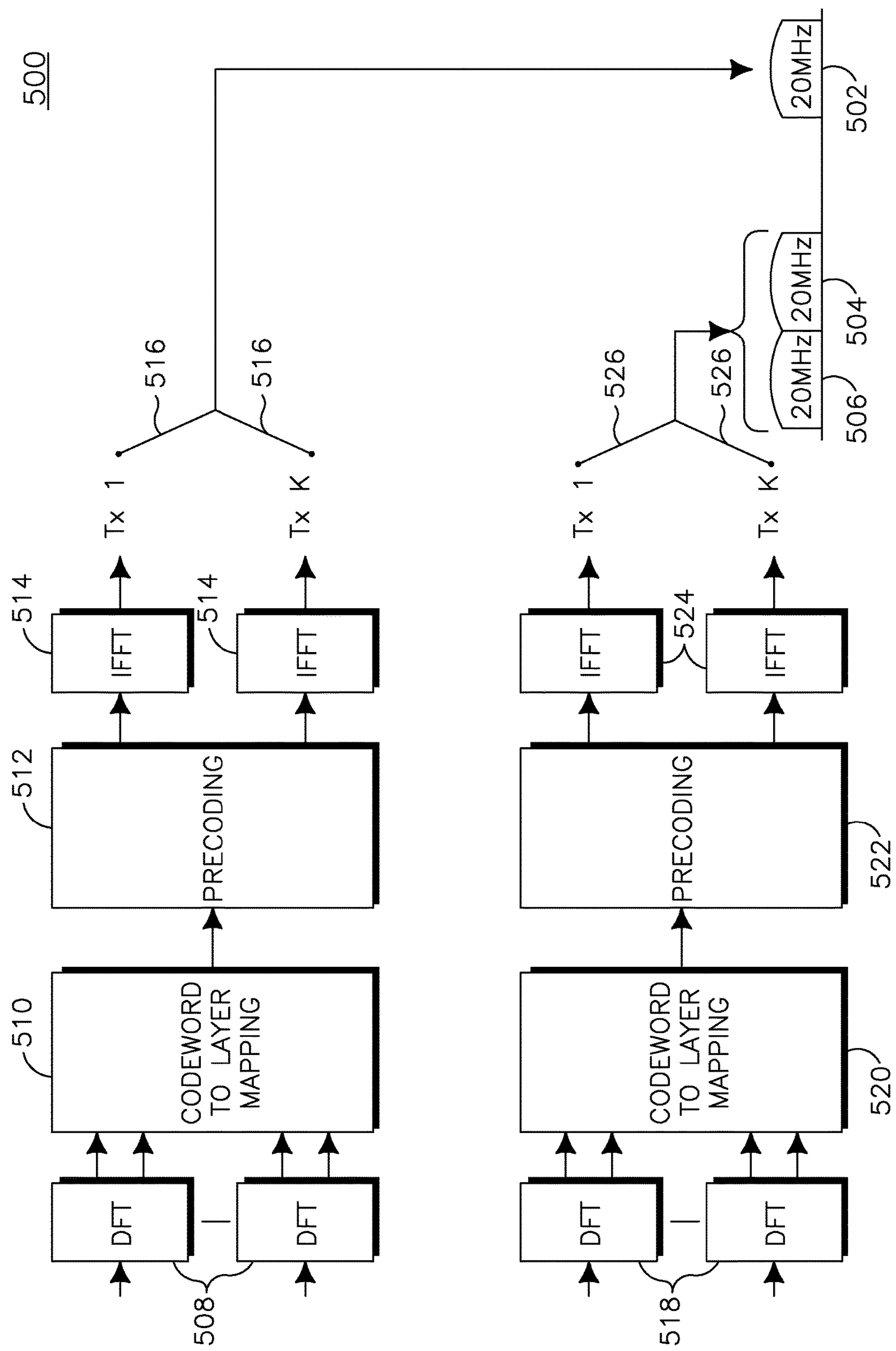
FIG. 5 shows an overview of a wireless communication system using carrier aggregation with non-contiguous carriers in accordance with another embodiment.

FIG. 5 shows an overview of uplink MIMO with carrier aggregation 500 in accordance with an embodiment. As shown in FIG. 5, a first carrier 502 is separated in frequency from a second carrier 504 and a third carrier 506. Data transmitted over the first carrier 502 is processed by a discrete Fourier transform (DFT) pair 508 and is processed by a codeword to layer mapping unit 510. The mapped data is precoded in a precoding unit 512, processed in an inverse fast Fourier transform (IFFT) pair 514, and transmitted through multiple antennas 516. The second carrier 504 and third carrier 506 are close together, so they may share a DFT pair 518. The information that is mapped to the second carrier 504 and third carrier 506 is first processed by the DFT pair 518 and processed in a codeword to layer mapping unit 520. The mapped information is precoded in a precoding unit 522 and processed in an IFFT pair 524 before being transmitted at multiple antennas 526.

In UL communications using multiple transmit antennas and multiple codewords, data bits and control bits may be multiplexed for optimal performance. Hybrid automated retransmission request (HARQ) acknowledge/non-acknowledge (ACK/NACK) bits may be mapped around any demodulation reference signals in time, while control information and data information may be mapped to different modulation symbols. A WTRU with multiple transmit antennas may use several MIMO techniques, such as MIMO precoding or transmit diversity schemes, for example.

As shown in FIG. 5, each codeword may use a separate DFT operation. When the WTRU uses more than one DFT operation with multiple codewords and multiple antennas, coded control information and coded data information may be divided into N groups of bits, corresponding to N layers, where each of the N layers is used to transmit control information and 1≤N≤(number of layers used for data transmission). When N=1, the control bits are all on one (1) layer.

The variable N may be configured such that control bits map to the same layers as one of the codewords. For example, three (3) layers may be used for data bits. If two (2) codewords are used, one codeword may be mapped to the first of the three (3) layers, and the second codeword may be mapped to the second and third layers of the three (3) layers. The control bits may be mapped to both the layers used by the second codeword.

Data and control bit multiplexing may be performed on a per layer basis. The control bits may be mapped to one layer, or may be spread out over multiple layers. Rank Indicator (RI) bits and HARQ ACK/NACK bits may be processed into layers as well. Each layer that includes data and/or control bits may be processed by a channel interleaver on a layer by layer basis.

Figure 6:
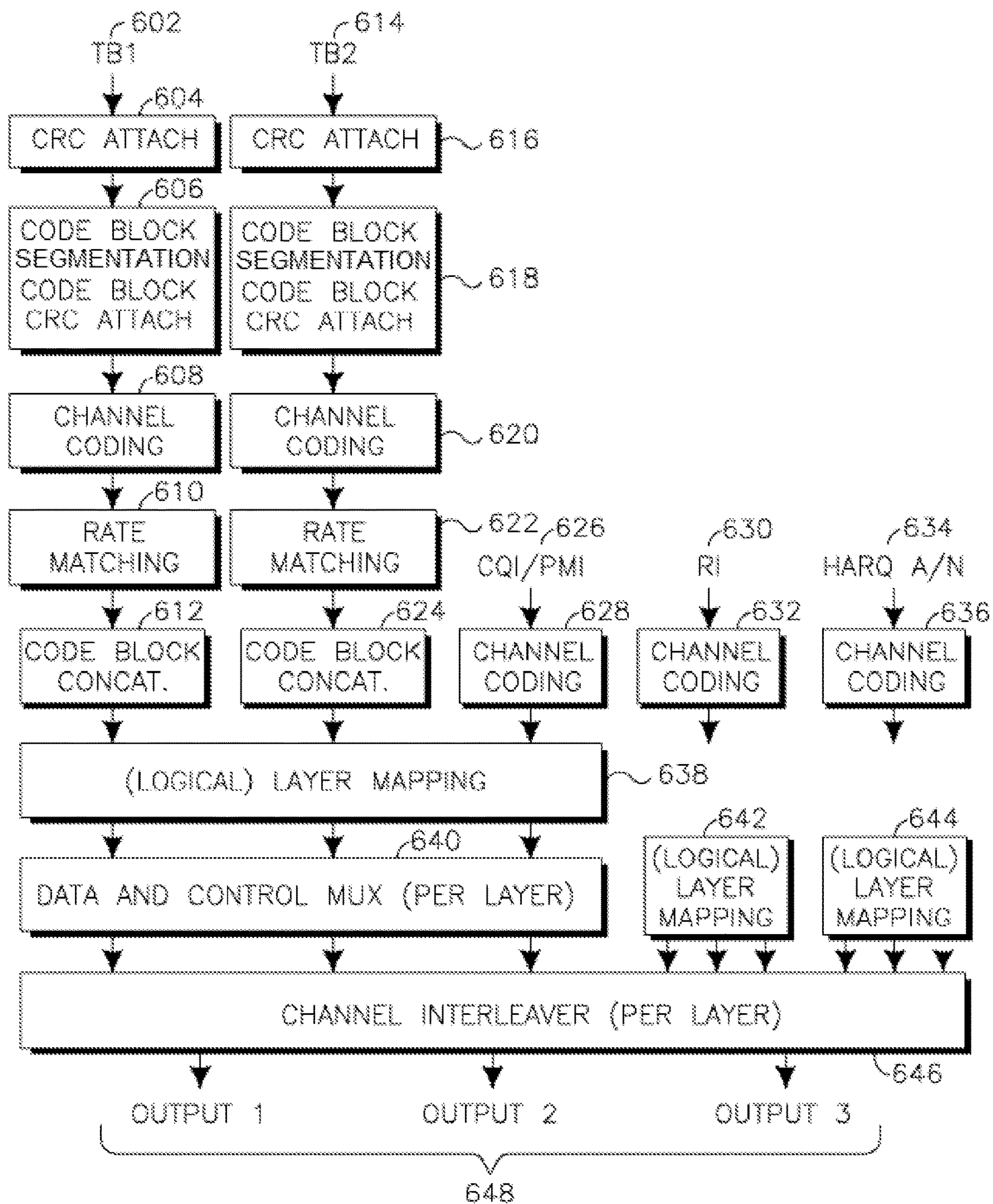
FIG. 6 is block diagram of a method of transport block processing in accordance with an embodiment.

FIG. 6 is block diagram of a method of transport block processing in accordance with an embodiment. Coded data bits are processed with coded control bits in a layer mapping function prior to the layers being multiplexed on a per layer basis. The control bits may be mapped to all the layers or separated by codeword, if multiple codewords are used.

As shown in FIG. 6, a first transport block (TB1) 602 that includes a set of coded data bits of a first codeword is input into a cyclic redundancy check (CRC) attachment unit 604. The output of the CRC attachment unit 604 is input into a code block segmentation and code block CRC attachment unit 606. The signal is then channel coded in a channel coding unit 608 and is input into a rate matching unit 610. From the rate matching unit, the signal is concatenated in a code block concatenation unit 612.

A second transport block 614 that includes a set of coded data bits of a second codeword is processed in the same manner as TB1 602. The data is processed by a CRC attachment unit 616, a code block segmentation and code block CRC attachment unit 618, a channel coding unit 620, a rate matching unit 622, and a code block concatenation unit 624.

CQI and PMI bits 626 are separately coded in a channel coding unit 628. RI bits 630 are separately coded in another channel coding unit 632. HARQ ACK/NACK bits 634 are coded in yet another channel coding unit 636. The coded data bits and the coded control bits are processed by a logical layer mapping function 638. The logical layer mapping function maps the input stream(s) (i.e. data and/or control bits) to one or more layers according to specific rules or criteria, for example higher MCS or SINR. The coded data bits and the coded control bits are divided into N groups and mapped to a codeword and layer on a per group basis, where N is an integer value. The N groups of bits correspond to N layers.

Data and control multiplexing is performed for each group or layer of data and control bits in a data and control multiplexing unit 640. The processing is performed on a per layer basis. The data and control multiplexing function may be layer-specific, and may process a different number of control and data bits per layer.

Similarly, coded RI bits are processed by a logical layer mapping function 642. Also, the coded HARQ bits are processed by a logical layer mapping function 644.

All the bits of each layer are processed by a channel interleaving function 646. As shown in FIG. 6, the logical layer mapping function has mapped all the bits to one of three layers. Each interleaved layer is then output individually 648.

Figure 7:
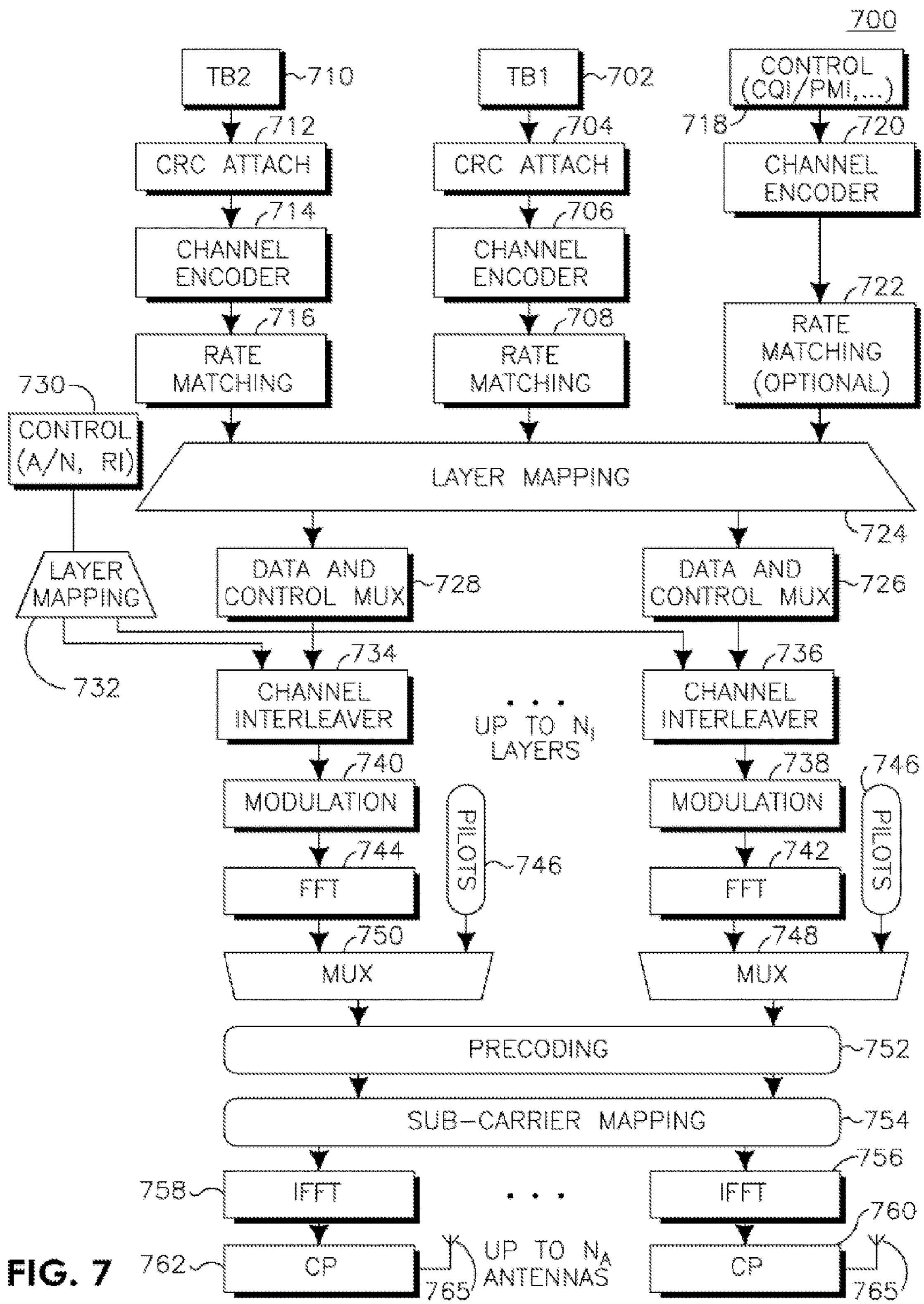
FIG. 7 shows a block diagram of a transmitter in accordance an embodiment.

FIG. 7 shows a block diagram of a transmitter 700 in accordance an embodiment. As shown in FIG. 7, data from TB1 702 is input into a CRC attachment unit 704 and is then input into a first channel coding unit 706. The coded data is then processed by a first rate matching unit 708.

TB2 710 is input into a second CRC attachment unit and is then input into a second channel coding unit 714. The coded data is then processed by a second rate matching unit 716.

Control information 718, such as PMI and CQI, for example, is channel coded by a channel coding unit 720 and is rate matched in a rate matching unit 722. The processed control information, the processed data from TB1 and the processed data from TB2, are processed into layers in a layer mapping unit 724.

A first data and control multiplexer 726 and a second data and control multiplexer 728 each multiplex a layer of processed control and data information. A second set of control information 730, such as RI and HARQ ACK/NACK, for example, is mapped into layers in a second layer mapping unit 732. A first channel interleaver 734 and a second channel interleaver 736 each interleave the layered and processed data and control information. A first modulation unit 738 and a second modulation unit 740 each modulate the interleaved data and control information. The modulated data and control information is processed by a first FFT unit 742 and a send FFT unit 744. A pilot signal 746 is then multiplexed with the transformed data and control signals in another multiplexer 748 and yet another multiplexer 750.

A precoding unit 752 processes and codes the multiplexed data. The precoded data is mapped to the subcarriers that are designated by an eNodeB in a subcarrier mapping unit 754. The subcarrier mapping unit outputs the mapped subcarriers for antenna mapping. Each output is processed by an inverse FFT unit 756,758 and a cyclic prefix unit 760,762 and it transmitted at each antenna.

Figure 8:
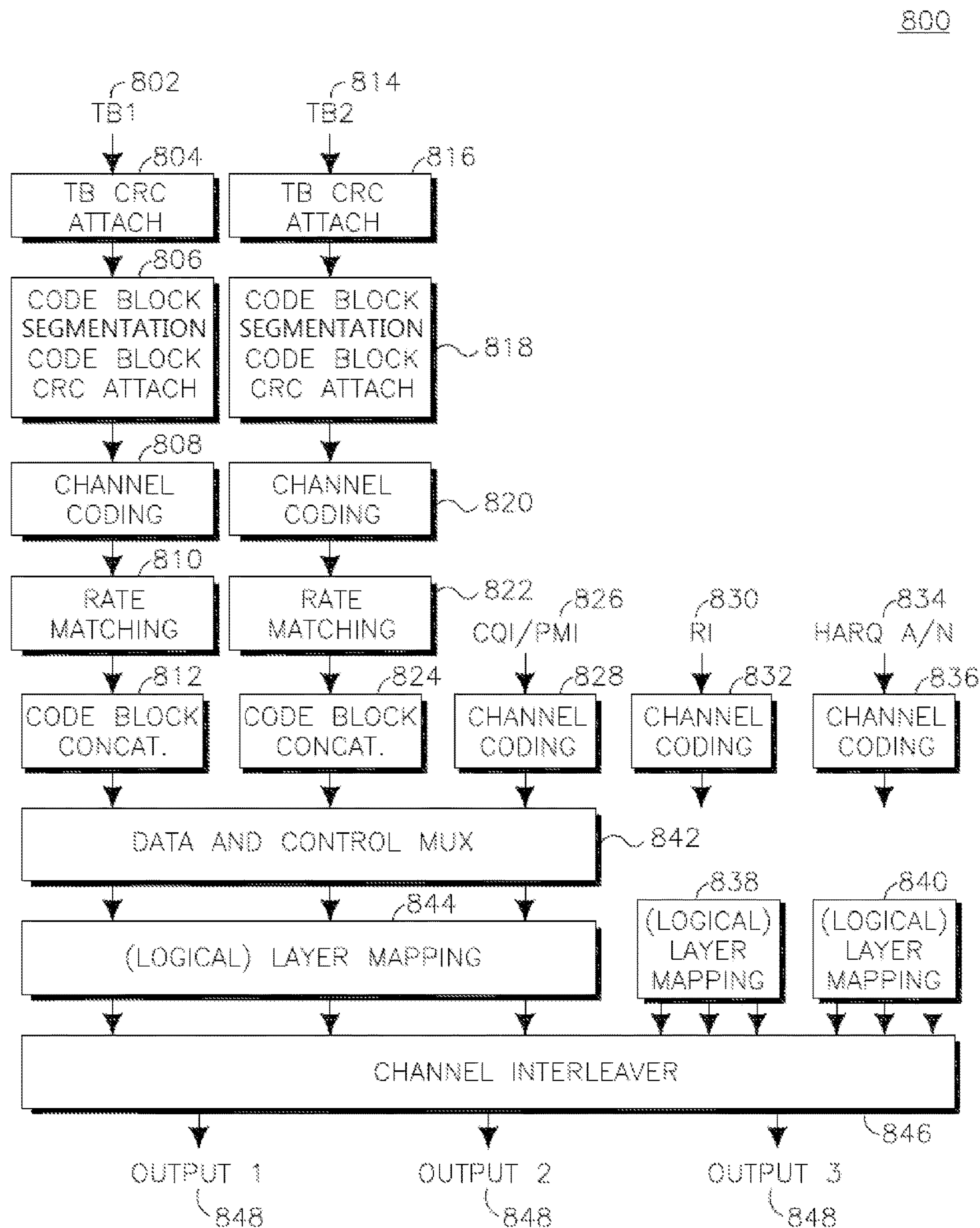
FIG. 8 is a block diagram of a method of transport block processing in accordance with another embodiment.

FIG. 8 is a block diagram of a method of transport block processing 800 in accordance with another embodiment. The control and data bits are multiplexed prior to being processed in a layer processing unit. The control bits may be multiplexed with the data bits of one or more codewords. The control and data bits are then mapped to one or more layers, each of which have both control and data bits.

As shown in FIG. 8, TB1 802 is input into a CRC attachment unit 804. The output of the CRC attachment unit 804 is input into a code block segmentation and code block CRC attachment unit 806. The data bits are then channel coded in a channel coding unit 808 and input into a rate matching unit 810. From the rate matching unit 810, the coded bits are concatenated in a code block concatenation unit 812.

TB2 814 includes a second set of coded bits of a second codeword and is processed in the same manner as TB1 802. TB2 814 is processed by a CRC attachment unit 816, a code block segmentation and code block CRC attachment unit 818, a channel coding unit 820, a rate matching unit 822, and a code block concatenation unit 824.

CQI/PMI bits 826 are separately coded in a channel coding unit 828. RI bits 830 are separately coded in another channel coding unit 832. HARQ ACK/NACK bits 834 are coded in yet another channel coding unit 836. The coded RI bits and the coded HARQ ACK/NACK bits are each processed by respective logical mapping functions (838, 840).

Prior to logical mapping, the processed CQI/PMI bits and processed data bits are multiplexed in a data and control multiplexing unit 842. The multiplexed data and CQI/PMI bits are then processed by a logical layer mapping function 844. The logical mapping function 844 divides the coded data bits and the coded control bits into N groups, where N is an integer value. The N groups of bits correspond to N layers. The processing is performed on a per layer basis. All the bits of all layers are processed by a channel interleaving function 846. As shown in FIG. 8, the logical layer mapping functions (838,840,844) have mapped all the bits to proper layers respectively. Each interleaved layer is then output individually 848.

Figure 9:
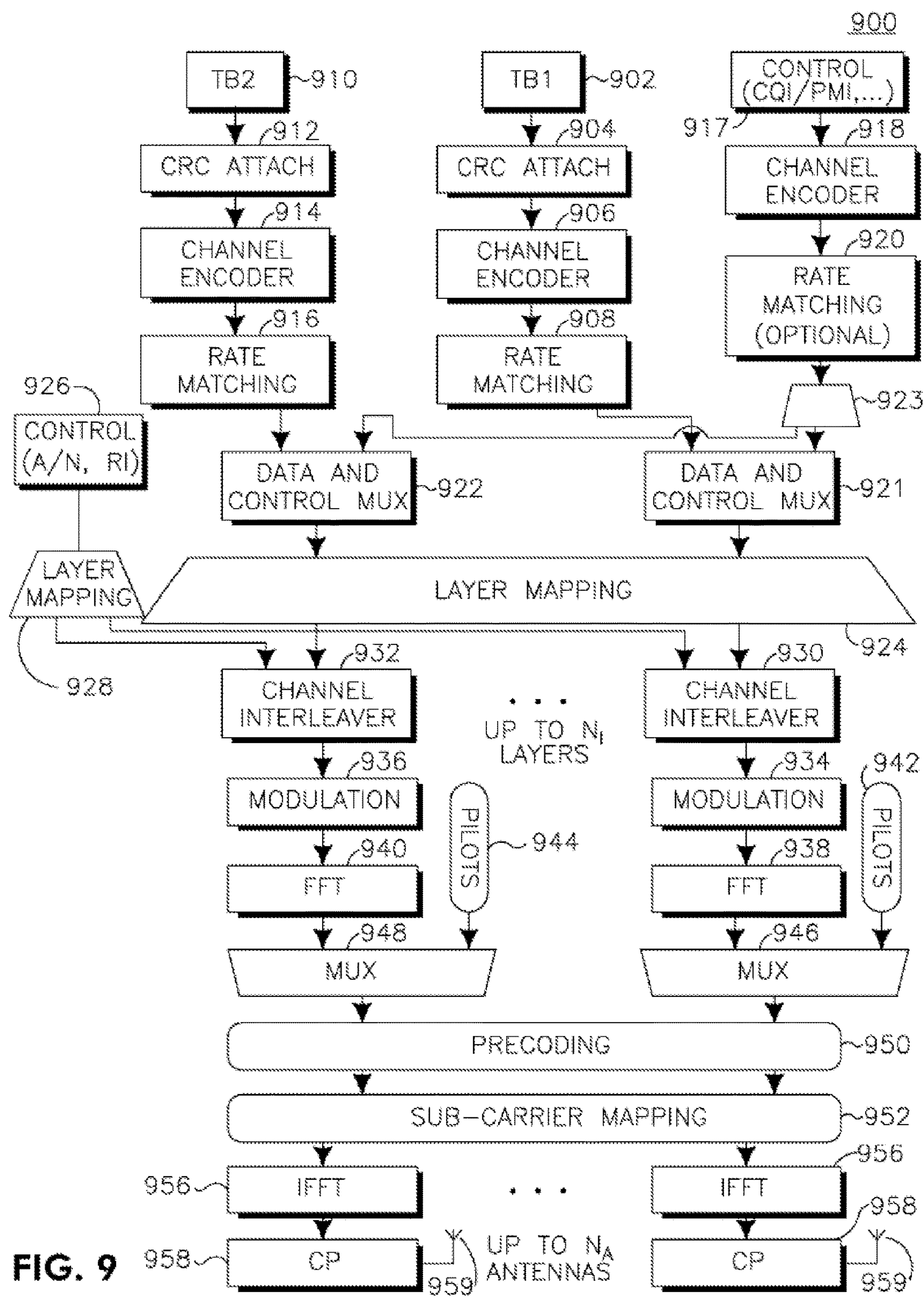
FIG. 9 shows a block diagram of a transmitter in accordance with the other embodiment.

FIG. 9 shows a block diagram of a transmitter 900 in accordance with the other embodiment. TB1 902 is input into a CRC attachment unit 904 and is then input into a first channel coding unit 906. The coded data is then processed by a first rate matching unit 908.

TB2 910 is input into a second CRC attachment unit 912 and is then input into a second channel coding unit 914. The coded data is then processed by a second rate matching unit 916.

Control data 917, such as PMI and CQI, for example, is channel coded by a channel coding unit 918 and is rate matched in a rate matching unit 920. A first data and control multiplexer 921 and a second data and control multiplexer 922 each multiplex the processed control and data information. The multiplexed information is processed into layers in a layer mapping unit 924. A second set of control information 926, such as RI and HARQ ACK/NACK, for example, is mapped into layers in a layer mapping unit 928. A first channel interleaver 930 and a second channel interleaver 932 each interleave the layered and processed data and control information. A first modulation unit 934 and a second modulation unit 936 each modulate the interleaved data and control information. The modulated data and control information is processed by a first FFT unit 938 and a second FFT unit 940. A pilot signal 942,944 is then multiplexed with the transformed data and control signals in a first multiplexer 946 and a second multiplexer 948.

A precoding unit 950 processes and codes the multiplexed data. The precoded data is mapped to the subcarriers as designated by an eNodeB in a subcarrier mapping unit 952. The subcarrier mapping unit outputs the mapped subcarriers for antenna mapping 954. Each output is processed by an IFFT unit 956 and a (CP) unit 958 and it transmitted at each antenna 959.

Figure 10:
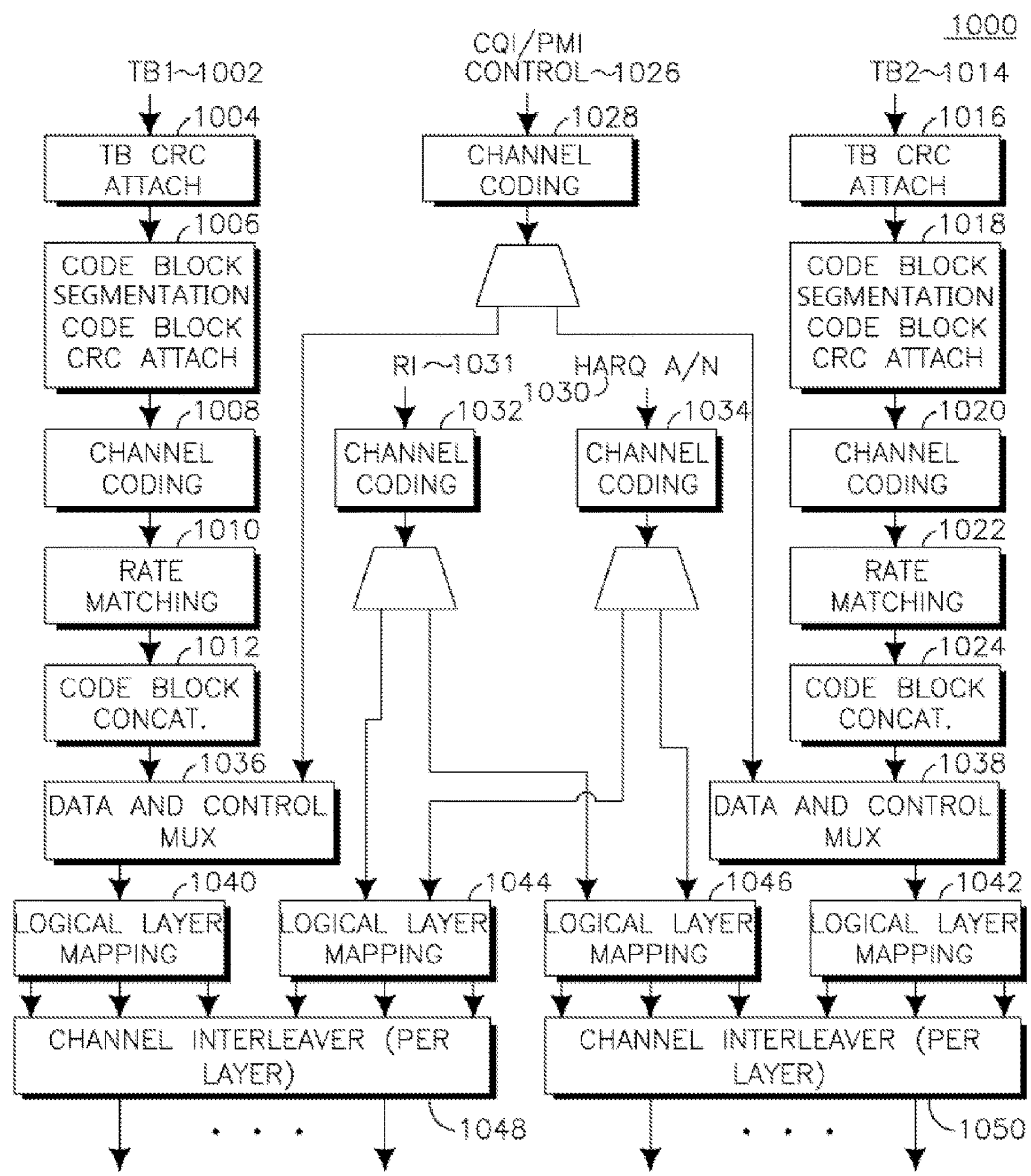
FIG. 10 is a block diagram of a method of transport block processing in accordance with yet another embodiment.

FIG. 10 is a block diagram of a method of transport block processing 1000 in accordance with yet another embodiment. Two codewords are used and the CQI/PMI bits are mapped to the codewords and multiplexed with the data bits prior to layer mapping. The logical layer function assigns the coded data and control bits of each codeword into at least one layer per codeword. For each layer that includes control bits, the channel interleaver processes the bits in a layer by layer manner.

As shown in FIG. 10, a first transport block (TB1) 1002 that includes a set of coded bits for a first codeword is input into a CRC attachment unit 1004. The output of the CRC attachment unit is input into a code block segmentation and code block attachment unit 1006. The signal is then channel coded in a channel coding unit 1008 and is input into a rate matching unit 1010. From the rate matching unit, the signal is concatenated in a code block concatenation unit 1012.

A second transport block (TB2) 1014 that includes a set of coded bits of a second codeword is processed in the same manner as TB1 1002. The data is processed by a CRC attachment unit 1016, a code block segmentation and code block CRC attachment unit 1018, a channel coding unit 1020, a rate matching unit 1022, and a code block concatenation unit 1024.

CQI/PMI bits 1026 are separately coded in a channel coding unit 1028 and mapped onto two codewords. The RI bits 1031 are separately coded in another channel coding unit 1032 and mapped to two codewords. HARQ ACK/NACK 1030 bits are coded in yet another channel coding unit 1034 and mapped to two codewords.

The coded data bits and the coded CQI/PMI bits are multiplexed in a data and control multiplex unit. The processed data bits from TB1 1002 are multiplexed with the processed CQI/PMI bits mapped to a first codeword in a control and data multiplexer 1036 that is separate from the code and data multiplexer 1038 used to multiplex the processed data bits from TB2 1014 with the processed CQI/PMI bits mapped to the second codeword.

The multiplexed data from TB1 and CQI/PMI bits mapped to the first codeword are processed in a first logical layer mapping function 1040. The multiplexed data from TB2 and the CQI/PMI bits mapped to the second codeword are processed in a second logical layer mapping function 1042. The coded RI bits and the coded HARQ bits mapped to the first codeword are processed by a logical layer mapping function 1044. The coded RI bits and the coded HARQ bits mapped to the second codeword are processed by another logical mapping function 1046.

All the bits mapped to the first codeword are processed by a channel interleaver 1048, and the interleaved data is output per layer. The bits mapped to the second codeword are processed by a second channel interleaver 1050, and are output per layer.

Figure 11:
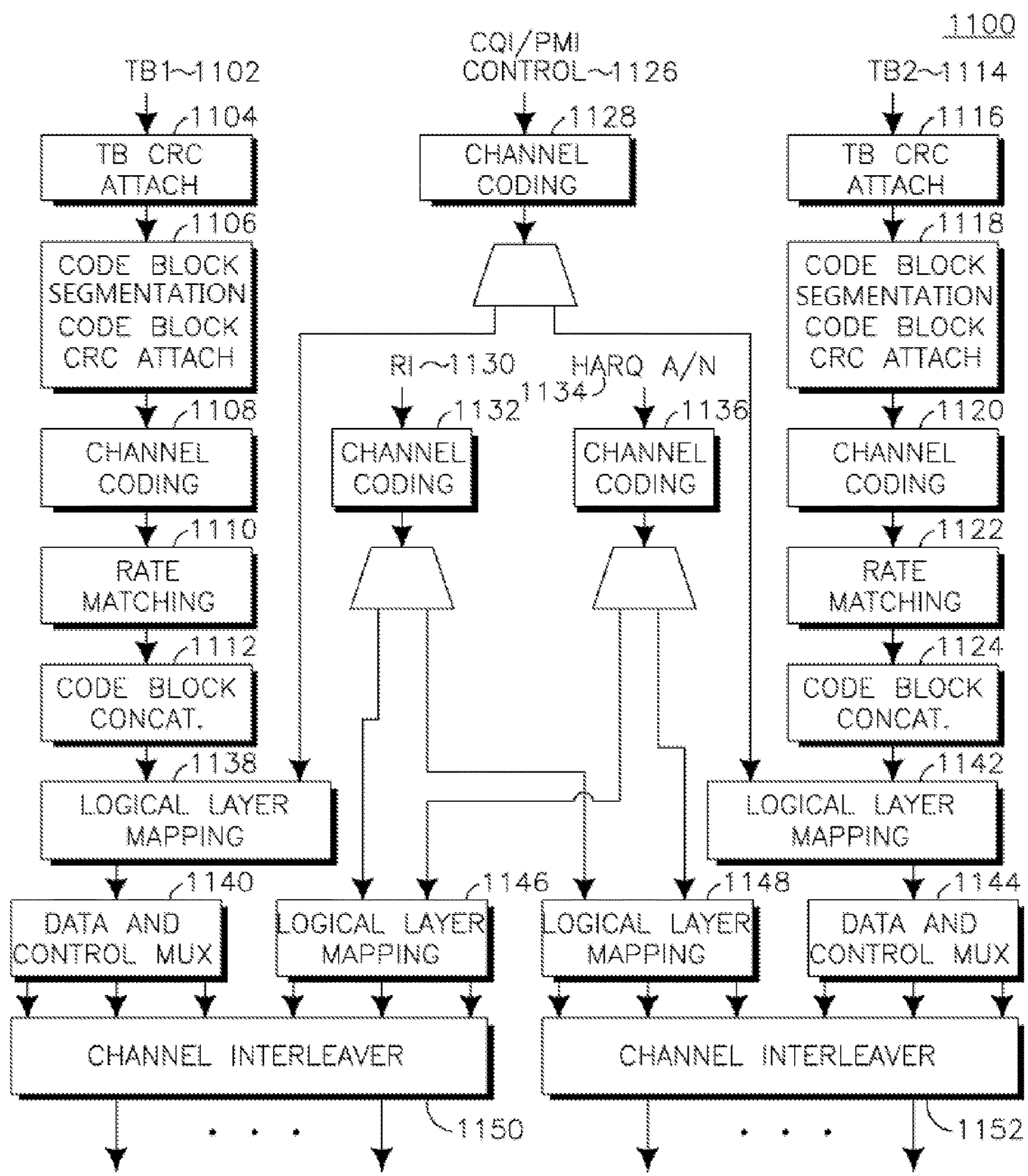
FIG. 11 is a block diagram of a method of transport block processing in accordance with an alternative embodiment.

FIG. 11 is a block diagram of a method of transport block processing 1100 in accordance with an alternative embodiment. Coded control bits are mapped to at least two codewords. For each codeword, the layer function divides the bits into logical layers. Mulitplexing is performed on a per layer basis and each of the layers is processed by the channel interleaver function. The control bits are processed by the layer function prior to multiplexing with the data bits.

A first transport block (TB1) 1102 that includes a first set of coded bits of a first codeword is input into a CRC attachment unit 1104. The output of the CRC attachment unit is input into a code block segmentation and code block CRC attachment unit 1106. The signal is then channel coded in a channel coding unit 1108 and is input into a rate matching unit 1110. From the rate matching unit, the signal is concatenated in a code block concatenation unit 1112.

A second transport block (TB2) 1114 that includes a second set of coded bits of a second codeword is processed in the same manner as TB1 1102. The data is processed by a CRC attachment unit 1116, a code block segmentation and code block CRC attachment unit 1118, a channel coding unit 1120, a rate matching unit 1122, and a code block concatenation unit 1124.

CQI/PMI 1126 bits are separately coded in a channel coding unit 1128 and mapped onto two codewords. The RI bits 1130 are separately coded in another channel coding unit 1132 and mapped to two codewords. HARQ ACK/NACK 1134 bits are coded in yet another channel coding unit 1136 and mapped to two codewords.

The multiplexed data from TB1 and CQI/PMI bits mapped to the first codeword are processed in a first logical layer mapping function 1138 and each layer is multiplexed in a data and control multiplex unit 1140. The multiplexed data from TB2 and the control bits mapped to the second codeword are processed in a second logical layer mapping function 1142 and each layer is multiplexed in a second data and control multiplexing unit 1144. The RI bits mapped to the first codeword and the HARQ bits mapped to the first codeword are processed by logical layer mapping function 1146. The RI bits mapped to the second codeword and the HARQ bits mapped to the second codeword are processed by another logical mapping function 1148.

All the bits mapped to the first codeword are processed by a channel interleaver 1150 and the interleaved data is output per layer. The bits mapped to the second codeword are processed by a second channel interleaver 1152 and are output per layer.

Data and control bits may be transmitted in the same UL subframe when the subframe is transmitted using physical uplink shared channel resources. While both data and control bits are processed by a DFT, they may not use the same DFT. In one example, both data and control bits may use rank one precoding. The WTRU may receive information regarding the UL transmission mode, plus other UL information, such as rank and precoding scheme, for example.

If the data and control bits use separate DFT processors, the WTRU may use one UL transmission scheme for the data bits, and a second UL transmission scheme for the control bits. For example, the control bits may be transmitted using UL transmit diversity, and the UL data bits may use another scheme, such as spatial multiplexing, for example.

Figure 12:
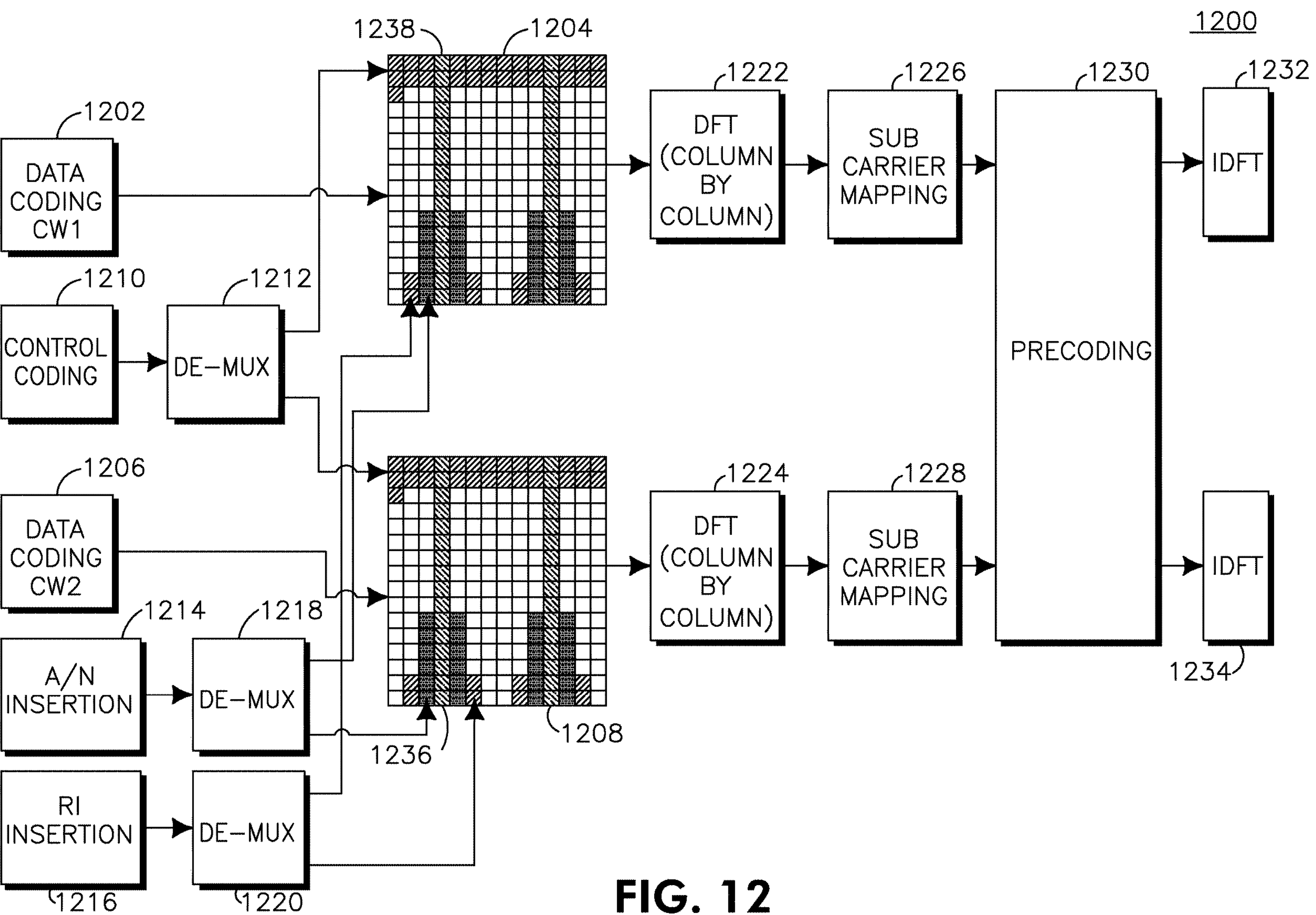
FIG. 12 is a block diagram showing control and data multiplexing for multiple layers and codewords in accordance with an embodiment

FIG. 12 is a block diagram showing control and data multiplexing for multiple layers and codewords 1200 in accordance with an embodiment. In FIG. 12, there are two (2) transport blocks and two (2) layers. However, the method is applicable to any number of transport blocks and any number of layers. The control bits may be repeated in each resource block, multiplexed between the resource blocks, or multiplexed with only one of the resource blocks. The term "resource block", as used herein, indicates virtual resource blocks that may be mapped to multiple layers of the same radio resources.

As shown in FIG. 12, data mapped to a first codeword 1202 is mapped to a first resource block 1204. Data mapped to a second codeword 1206 is mapped to a second resource block 1208. The coded control information 1210 is demultiplexed, or repeated and mapped to each of the first resource block 1204 and second resource block 1208. Alternatively, the coded control information may be mapped to just one of the resource blocks (not shown). The coded HARQ ACK/NACK information 1214 and the coded RI information 1216 are also demultiplexed or repeated 1218,1220 and mapped to each of the first resource block 1204 and the second resource block 1208. Alternatively, the coded HARQ ACK/NACK information 1214 and the coded RI information 1216 may be mapped to just one of the resource blocks (not shown). The information in each resource block 1204,1208 may be processed by a first DFT 1222 and a second DFT 1224 and a first subcarrier mapping block 1226 and second subcarrier mapping block 1228, where the data bits, control bits, HARQ bits and RI bits are mapped to one or more subcarriers. The information is then precoded 1230 and processed in a first inverse DFT 1232 and a second inverse DFT 1234.

As shown in FIG. 12, for each layer, HARQ information may be present in both resource blocks 1204, 1208 and is mapped to resources around the uplink demodulation reference signals 1236, 1238. The control and data information are mapped to different modulation symbols within each resource block 1204, 1208.

Uplink control information (UCI) bits may alternatively be distributed between codewords for a system using multiple codewords and layers. The UCI bits may alternatively be mapped to a single codeword. Each control bit may be demultiplexed or repeated and mapped to each codeword, and the layering process may distribute the control bits between the layers. Alternatively, each layer may include each control bit, and each control bit may be repeated once for each layer, as well as once for each codeword. While FIG. 12 shows a method using two (2) codewords and two (2) layers, the method shown in FIG. 12 is extendable to more than two (2) layers. For example, the method may include three (3) layers with one of the codewords split over two of the layers. The control information would then be multiplexed with data on up to three (3) resource blocks, and similarly ACK/NACK and RI would map into 1, 2 or 3 resource blocks.

Figure 13:
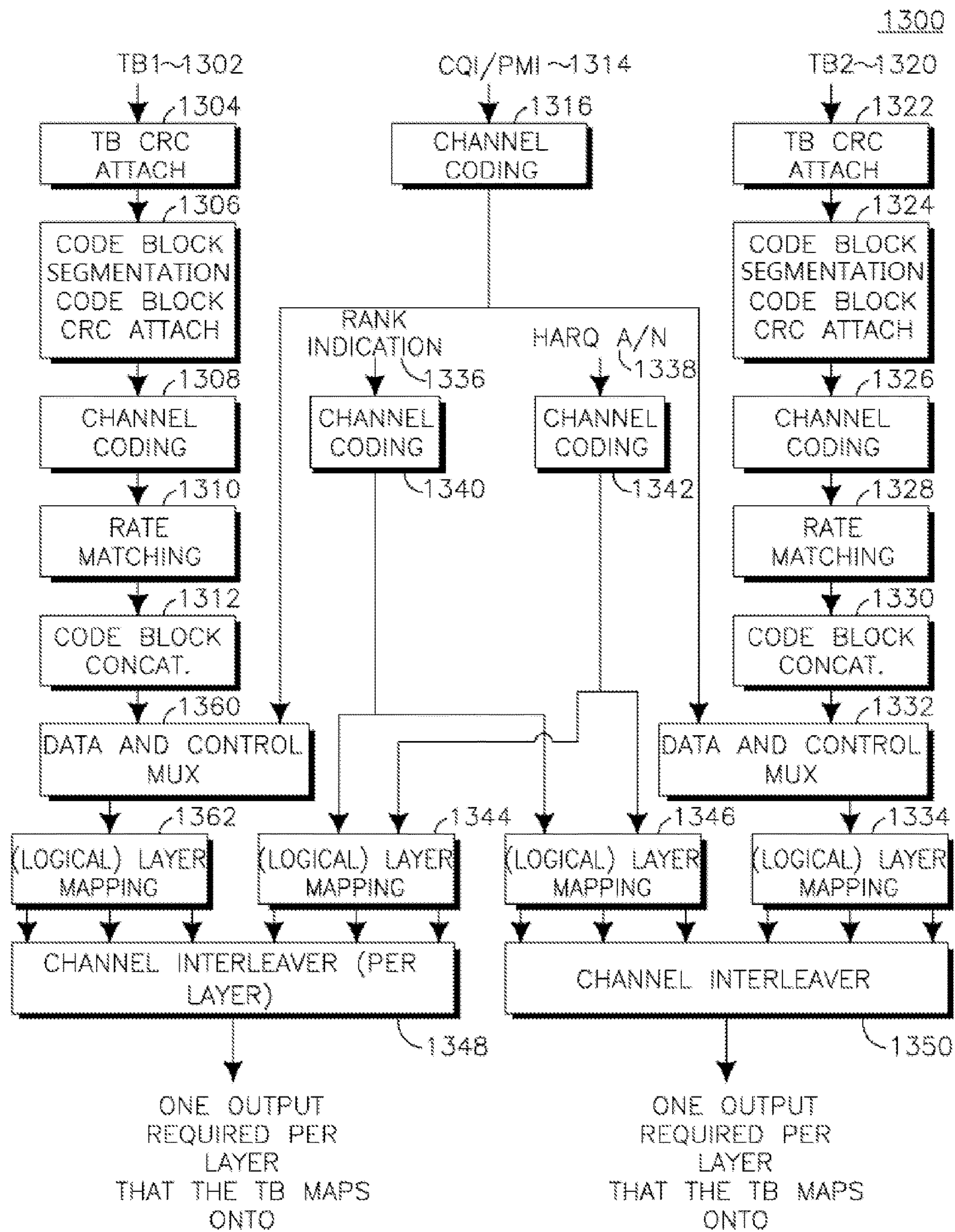
FIG. 13 is a block diagram of a method of UCI bit mapping in accordance with an embodiment.

FIG. 13 is a block diagram of a method of transmitting UCI bits 1300 in accordance with another embodiment. FIG. 13 shows a system using two (2) layers, i.e. rank two (2) for two (2) or more antennas, two (2) codewords and UCI bits mapped across all layers.

As shown in FIG. 13, TB1 1302 is processed by a CRC attachment function 1304 and then a code block segmentation and code block CRC attachment function 1306. The processed TB1 bits are channel coded by a channel coding unit 1308, rate matched in a rate matching unit 1310 and concatenated in a code block concatenation unit 1312. CQI/PMI bits 1314 are channel coded in a channel coding unit 1316 and repeated over two (2) streams. The processed TB1 bits are then input into a control and data multiplexer 1360 along with a (first) stream of CQI/PMI bits. The multiplexed bits are then mapped to a layer in a first layer mapping unit 1362.

TB2 1320 is mapped to the second codeword and is processed by a CRC attachment function 1322 and then a code block segmentation and code block CRC attach function 1324. The processed TB2 bits are channel coded by a channel coding unit 1326, rate matched in a rate matching unit 1328 and concatenated in a code block concatenation unit 1330. The processed TB2 bits are multiplexed with the other (second) stream of CQI/PMI bits in a second data and control multiplexer 1332. The multiplexed bits are mapped in a second layer mapping unit 1334.

RI bits 1336 and HARQ ACK/NACK bits 1338 are channel coded 1340, 1342, repeated over two (2) streams, and respectively mapped to two layers in a third and fourth layer mapping unit 1344, 1346. The mapped TB1 bits, a first stream of CQI/PMI bits, a first stream of RI bits and a stream of HARQ ACK/NACK bits are interleaved in a first channel interleaver unit 1348, and output to the antenna mapping unit (not pictured). The antenna mapping unit includes modulation, subcarrier mapping, precoding, and antenna mapping functions. The mapped TB2 bits, a second stream of CQI/PMI bits, a second stream of RI bits and a second stream of HARQ ACK/NACK bits are interleaved in a second channel interleaver unit 1350, and output to the antenna mapping unit (not pictured).

Figure 14:
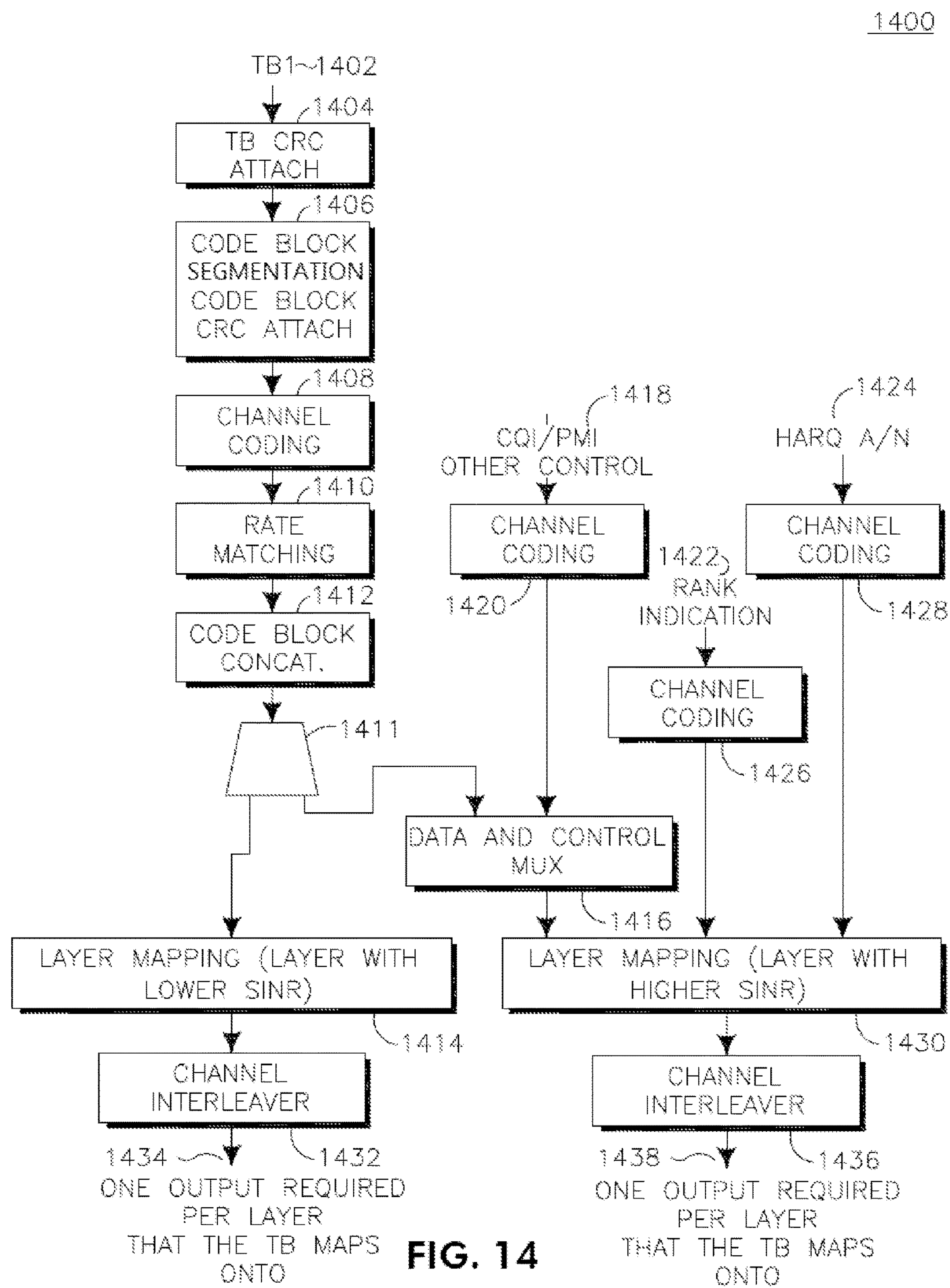
FIG. 14 is a block diagram of a method of UCI bit mapping in accordance with yet another embodiment.

FIG. 14 is a block diagram of a method of UCI bit mapping 1400 in accordance with an embodiment. FIG. 14 shows a method using one (1) codeword and two (2) layers. The method uses rank 2 coding for 2 or more antennas, with the UCI bits mapped to one layer. TB1 1402 is processed by a CRC attach function 1404 and then a code block segmentation and code block CRC attach function 1406. The processed TB1 bits are channel coded by a channel coding unit 1408, rate matched in a rate matching unit 1410 and concatenated in a code block concatenation unit 1412. The output of the code block concatenation unit is split into two streams at a splitter 1411 with lengths calculated to account for the multiplexing with UCI bits. The first stream, which is the stream with the longer length, is mapped to a first layer with a relatively lower SINR in a layer mapping unit 1414. The second stream is multiplexed in a data and control multiplexing unit 1416 with CQI/PMI bits 1418 that have been channel coded in a channel coding unit 1420. RI bits 1422 and HARQ ACK/NACK bits 1424 are also channel coded in respective channel coding units 1426, 1428 and are mapped to the second layer with relatively higher SINR along with the multiplexed CQI/PMI bits and processed TB1 bits in a second layer mapping unit 1430. The mapped bits from the first layer mapping unit are processed, per layer, by a channel interleaver unit 1432 and are output to a first antenna mapping unit 1434. The antenna mapping unit includes modulation, subcarrier mapping, precoding, and antenna mapping functions. The mapped bits from the second layer mapping unit are processed by a second channel interleaver unit 1436 and output to a second antenna mapping unit (not pictured).

Figure 15:
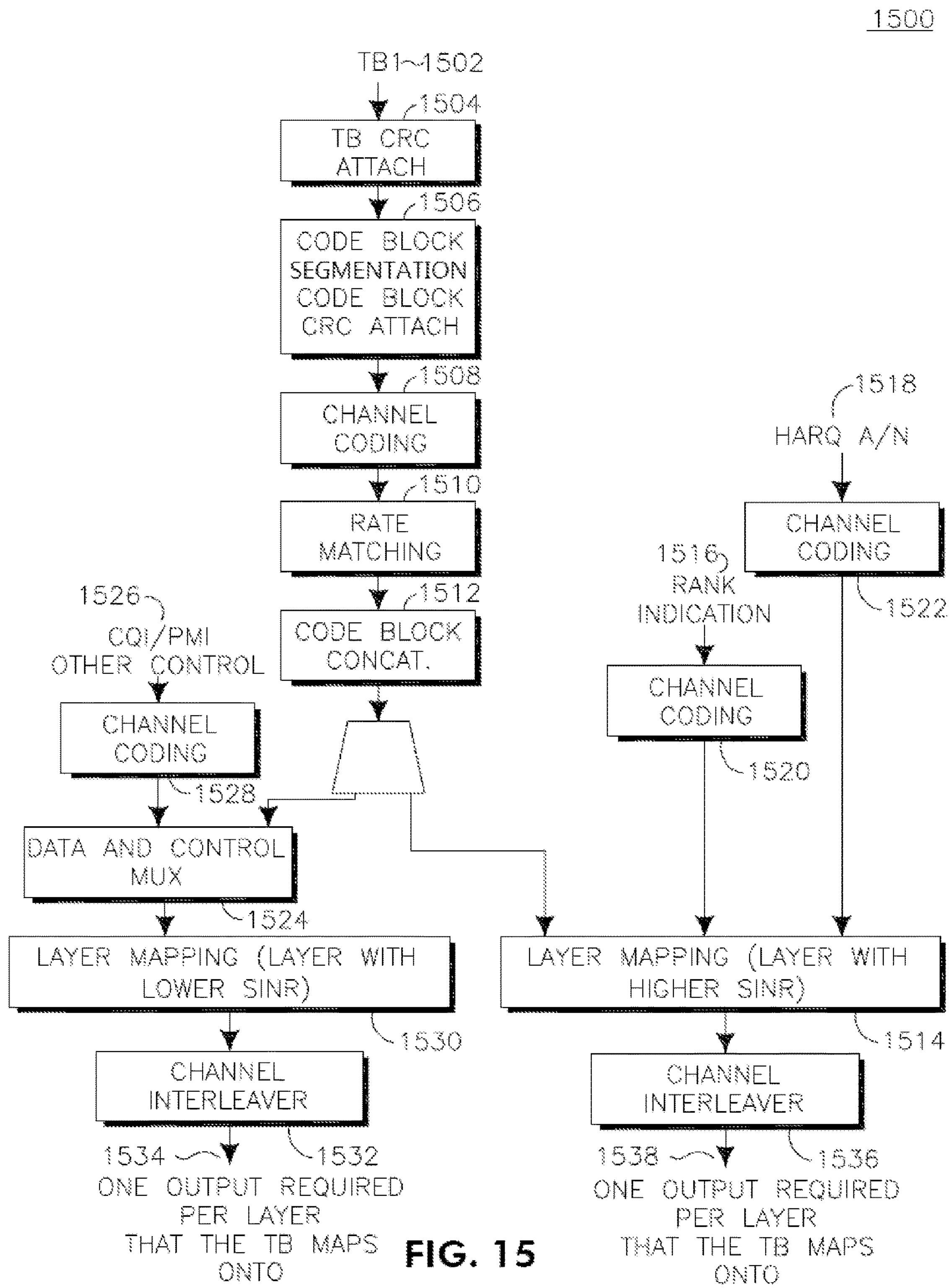
FIG. 15 is a block diagram of a method of UCI bit mapping in accordance with yet another embodiment.

FIG. 15 is a block diagram of a method of UCI bit mapping 1500 in accordance with an alternative embodiment. In FIG. 15 there are two (2) layers, corresponding to a system of rank 2 with at least two (2) transmit antennas, one (1) codeword and the UCI bits are split between two (2) layers. The CQI/PMI bits are transmitted in the layer with the relatively lower signal and interference to noise ratio (SINR), and the RI and ACK/NACK bits are transmitted in the layer with the relatively higher SINR.

TB1 1502 is processed by a CRC attach function 1504 and a code block segmentation and code block CRC attach function 1506. The processed TB1 bits are channel coded by a channel coding unit 1508, rate matched in a rate matching unit 1510 and concatenated in a code block concatenation unit 1512. The output of the code block concatenation unit is mapped to a layer with a relatively higher SINR in a layer mapping unit 1514 along with RI bits 1516 and HARQ ACK/NACK bits 1518 that have been channel coded in respective channel coding units 1520, 1522. The output of the code block concatenation unit 1512 is also multiplexed in a data and control multiplexing unit 1524 with CQI/PMI bits 1526 that have been channel coded in a channel coding unit 1528. The multiplexed bits are mapped to a first layer with a relatively lower SINR in a layer mapping unit 1530. The mapped bits from the first layer mapping unit 1530 are processed, per layer, by a channel interleaver unit 1532 and are output to a first antenna mapping unit 1534. The mapped bits from the second layer mapping unit 1514 are processed by a second channel interleaver 1536 unit and output to a second antenna mapping unit (not pictured).

Figure 16:
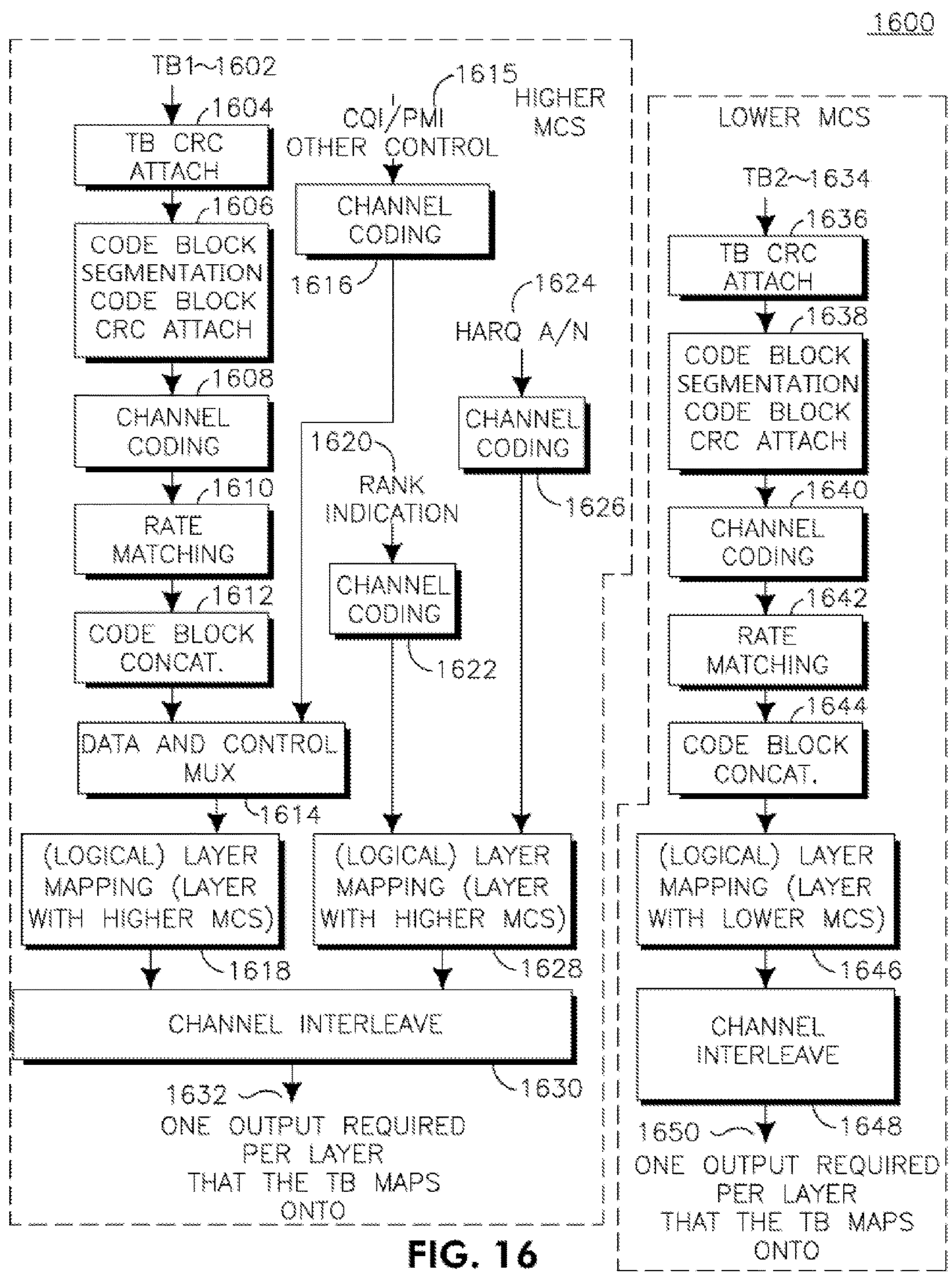
FIG. 16 is a block diagram of a method of UCI bit mapping in accordance with yet another embodiment.

FIG. 16 is a block diagram of a method of transmitting UCI bits 1600 in accordance with another embodiment. FIG. 16 shows a system using two (2) layers, corresponding to a system of rank 2 including at least 2 transmit antennas, two (2) codewords arranged as one layer per codeword, and UCI bits mapped to one (1) layer. The UCI bits are mapped to the layer with the higher MCS index.

As shown in FIG. 16, TB1 1602 is processed by a CRC attach function 1604 and then a code block segmentation and code block CRC attach function 1606. The processed TB1 bits are channel coded by a channel coding unit 1608, rate matched in a rate matching unit 1610 and concatenated in a code block concatenation unit 1612. The processed TB1 bits are then input into a control and data multiplexer 1614 along with CQI/PMI bits 1615 that have been channel coded in a channel coding unit 1616. The multiplexed bits are then mapped to a layer with a relatively higher SINR, i.e. higher MCS in a first layer mapping unit 1618. RI bits 1620 are channel coded 1622 and HARQ ACK/NACK bits 1624 are channel coded 1626. The coded RI bits and HARQ ACK/NACK bits are also mapped to the layer with a relatively higher SINR, i.e. higher MCS in a second layer mapping unit 1628. The mapped TB1 bits and UCI bits are interleaved with mapped RI bits and HARQ ACK/NACK bits in a channel interleaver unit 1630, and the single layer output is sent to a first antenna mapping unit (not pictured).

TB2 1634 includes data mapped to the second codeword and is processed by a CRC attach function 1636 and a code block segmentation and code block CRC attach function 1638. The processed TB2 bits are channel coded by a channel coding unit 1640, rate matched in a rate matching unit 1642 and concatenated in a code block concatenation unit 1644. The processed TB2 bits are layer mapped to a layer with a relatively lower SINR i.e. lower MCS in a layer mapping unit 1646 and interleaved in a channel interleaver unit 1648. The processed TB2 bits are output to a second antenna mapping unit (not pictured).

Figure 17:
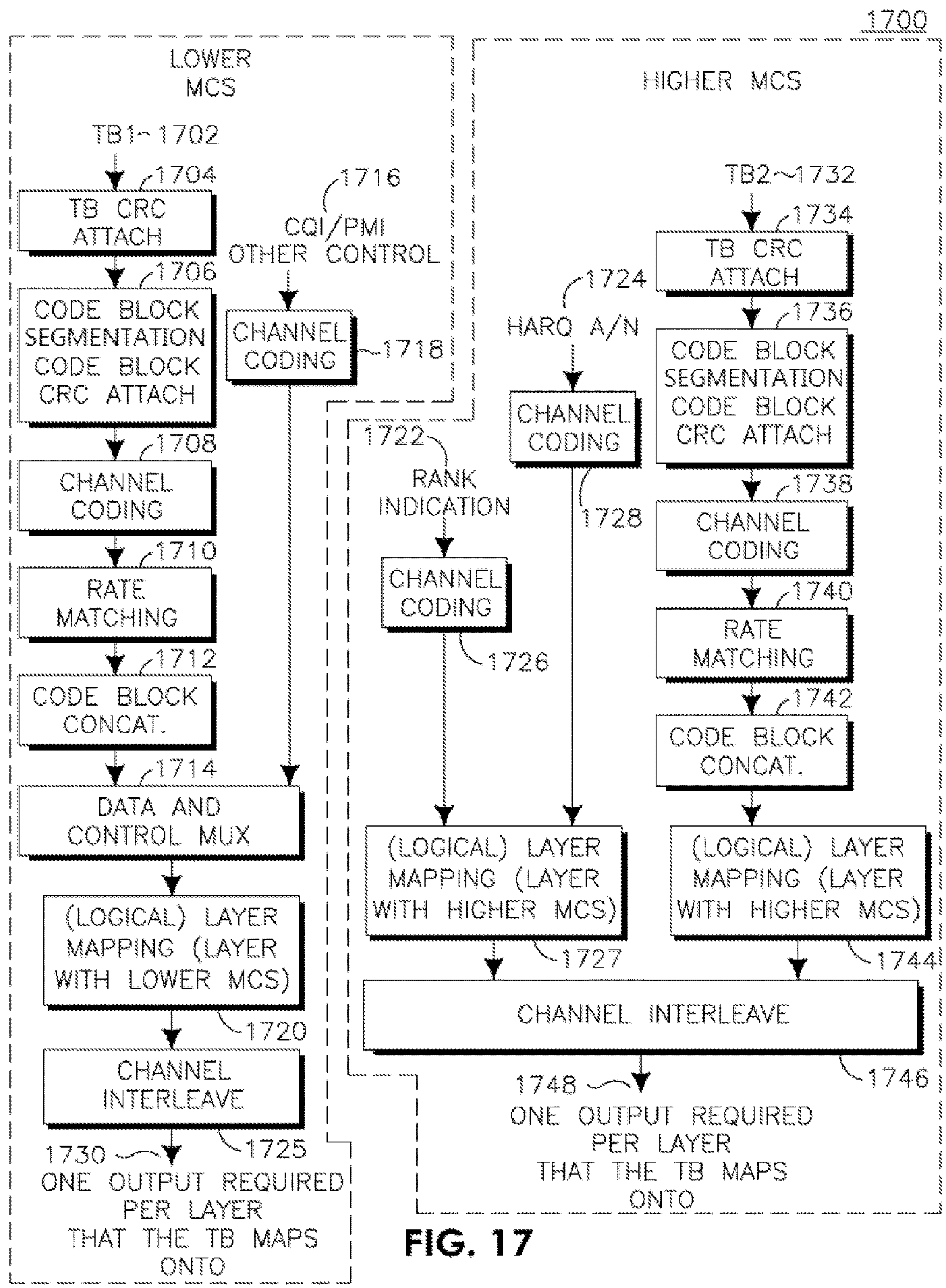
FIG. 17 is a block diagram of a method of UCI bit mapping in accordance with yet another embodiment.

FIG. 17 is a block diagram of a method 1700 of transmitting UCI bits in accordance with another embodiment. FIG. 17 shows a system using two (2) layers, corresponding to a system of rank 2 including at least two (2) transmit antennas, two (2) codewords. CQI/PMI bits are mapped to the layer with the relatively lower SINR, i.e. lower MCS, and the RI and ACK/NACK bits are mapped to the layer with the relatively higher SINR, i.e. higher MCS. With this method, the reliability of the RI and ACK/NACK bits may be improved.

As shown in FIG. 17, TB1 1702 is processed by a CRC attach function 1704 and a code block segmentation and code block CRC attach function 1706. The processed TB1 bits are channel coded by a channel coding unit 1708, rate matched in a rate matching unit 1710 and concatenated in a code block concatenation unit 1712. The processed TB1 bits are then input into a control and data multiplexer 1714 along with CQI/PMI bits 1716 that have been channel coded in a channel coding unit 1718. The multiplexed bits are then mapped to a layer with a relatively lower SINR, i.e. lower MCS in a first layer mapping unit 1720. The mapped TB1 bits and CQI/PMI bits are interleaved in a channel interleaver unit 1725, and the channel interleaver output is sent to a first antenna mapping unit (not pictured).

TB2 1732 is mapped to the second codeword and is processed by a CRC attach function 1734 and then a code block segmentation and code block CRC attach function 1736. The processed TB2 bits are channel coded by a channel coding unit 1738, rate matched in a rate matching unit 1740 and concatenated in a code block concatenation unit 1742. The processed TB2 bits are layer mapped in a layer mapping unit 1744. Channel coded RI bits 1722 and HARQ ACK/NACK bits 1724 are combined with the processed TB2 data bits and mapped to the layer with a relatively higher SINR, i.e. higher MCS by a second layer mapping unit 1727. Then the mapped bits are interleaved in a channel interleaver unit 1746 and then output to a second antenna mapping unit (not pictured).

In an alternative embodiment of FIG. 17, CQI/PMI bits are mapped to the layer with the relatively higher SINR, i.e. a higher MCS. The RI and ACK/NACK bits are mapped to the layer with the relatively lower SINR, i.e. lower MCS. With this method, the reliability of the CQI bits may be improved.

Figure 18:
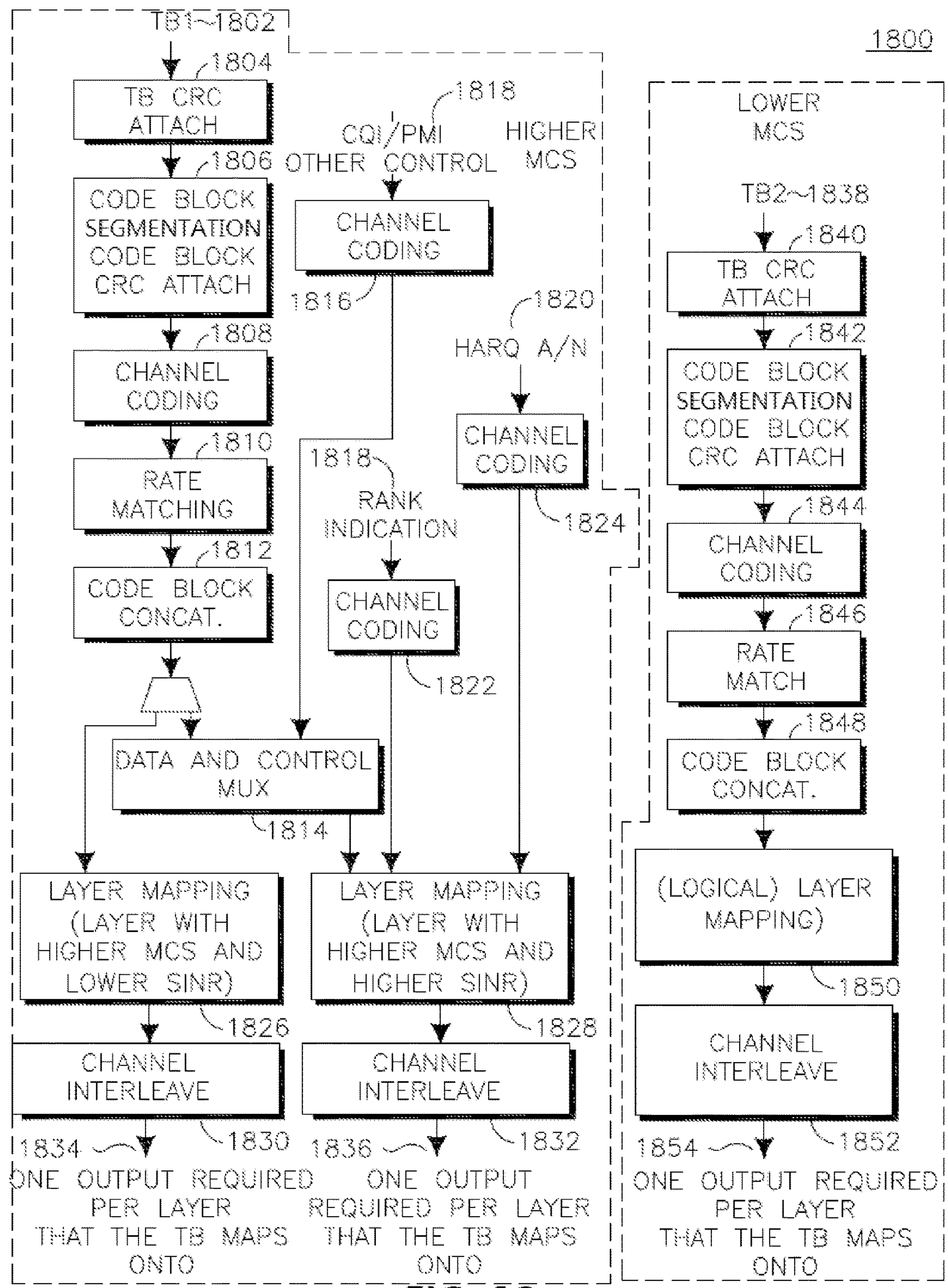
FIG. 18 is a block diagram of a method of UCI bit mapping in accordance with yet another embodiment.

FIG. 18 is a block diagram of a method of transmitting UCI bits in accordance with another embodiment. FIG. 18 shows a system using three (3) layers corresponding to a system of rank 3 with at least 3 transmit antennas), two (2) codewords and UCI bits mapped to one (1) layer. UCI bits are transmitted in the layer with the highest MCS and the highest SINR per layer. A first codeword is mapped to two layers. The layer used by the first codeword that also has the highest SINR includes the UCI bits.

Coded TB1 1802 is processed by a CRC attachment function 1804 and then a code block segmentation and code block CRC attachment function 1806. The processed TB1 bits are channel coded by a channel coding unit 1808, rate matched in a rate matching unit 1810 and concatenated in a code block concatenation unit 1812. The processed TB1 bits are split into two streams and one stream is then input into a control and data multiplexer 1814 along with UCI bits 1818 that have been channel coded in a channel coding unit 1816. The multiplexed bits are then mapped to a layer with a relatively higher MCS and highest SINR in a first layer mapping unit 1826. Channel coded rank indication bits and HARQ ACK/NACK bits are also mapped to the layer with a relatively higher MCS and lower SINR in a second layer mapping unit 1828. The group of mapped TB1 bits and UCI bits (CQI/PMI, Rank indication and HARQ ACK/NACK bits) in a channel interleaver unit 1832 are interleaved, and then output to an antenna mapping unit (not pictured). The antenna mapping unit includes modulation, subcarrier mapping, precoding, and antenna mapping functions as shown in FIGS. 7 and 9.

TB2 1838 is mapped to the second codeword and is processed by a CRC attachment function 1840 and then a code block segmentation and code block CRC attachment function 1842. The processed TB2 bits are channel coded by a channel coding unit 1844, rate matched in a rate matching unit 1846 and concatenated in a code block concatenation unit 1848. The processed TB2 bits are layer mapped in a layer with relatively lower MCS in a mapping unit 1850 and interleaved in a channel interleaver unit 1852. The processed TB2 bits, are mapped to the second codeword, are then output to an antenna mapping unit (not pictured).

Figure 19:
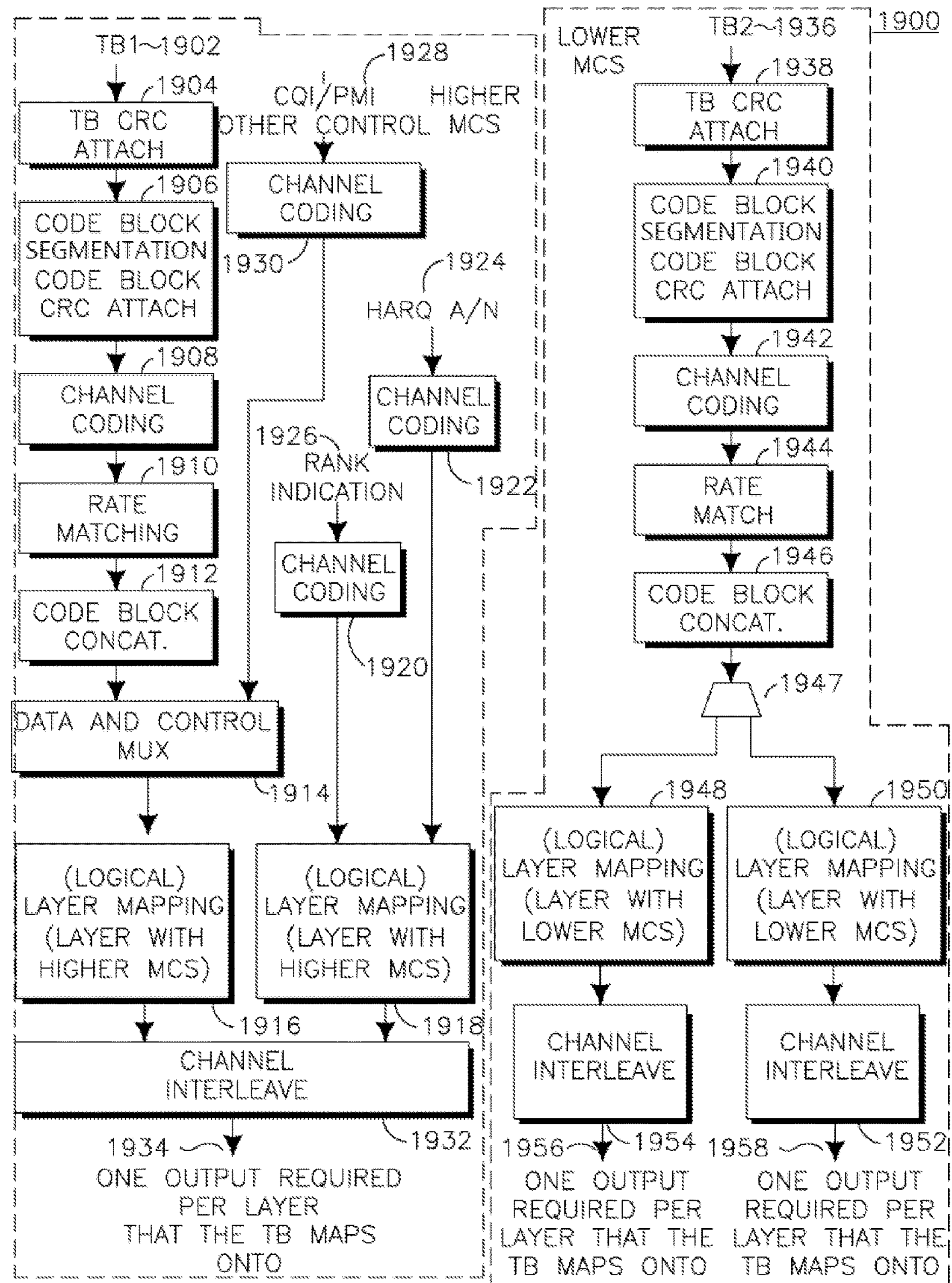
FIG. 19 is a block diagram of a method of UCI bit mapping in accordance with yet another embodiment.

FIG. 19 is a block diagram of a method 1900 of transmitting UCI bits in accordance with another embodiment. In FIG. 19, a system uses two (2) codewords and three (3) layers (i.e. rank 3 for three (3) or more transmit antennas). The UCI bits multiplexed with TB1 bits are mapped to the first codeword, as it has the higher MCS. The CQI/PMI bits are mapped to one layer of the first codeword and the RI and ACK/NACK bits are also mapped to the same layer of the first codeword since the first codeword has been assigned only one layer.

As shown in FIG. 19, TB1 1902 is processed by a CRC attachment function 1904 and then a code block segmentation and code block CRC attachment function 1906. The processed TB1 bits are channel coded by a channel coding unit 1908, rate matched in a rate matching unit 1910 and concatenated in a code block concatenation unit 1912. The processed TB1 bits are then input into a control and data multiplexer 1914 along with UCI bits 1928 that have been channel coded in a channel coding unit 1930. The multiplexed bits are then mapped to a layer with a relatively higher MCS in a first layer mapping unit 1916. RI bits 1926 and HARQ ACK/NACK bits 1924 are each coded by a respective channel coding unit 1920, 1922. The Channel coded rank indication bits and HARQ ACK/NACK bits are also mapped to the layer with a relatively higher MCS in a second layer mapping unit 1918. The mapped TB1 bits and UCI bits (CQI/PMI, Rank indication and HARQ ACK/NACK bits) are interleaved in a channel interleaver unit 1932, and then the single layer output is sent to an antenna mapping unit (not pictured).

TB2 1936 is mapped to the second codeword and is processed by a CRC attachment function 1938 and then a code block segmentation and code block CRC attachment function 1940. The processed TB2 bits are channel coded by a channel coding unit 1942, rate matched in a rate matching unit 1944 and concatenated in a code block concatenation unit 1946. The processed TB2 bits are split into two (2) streams at a splitter 1947 and layer-mapped respectively in a layer mapping unit 1948, 1950. Then the mapped bits are interleaved in a respective channel interleaver unit 1952, 1954. The processed TB2 bits, mapped to the second codeword which has two layers, are then output to the antenna mapping unit (not pictured).

Figure 20:
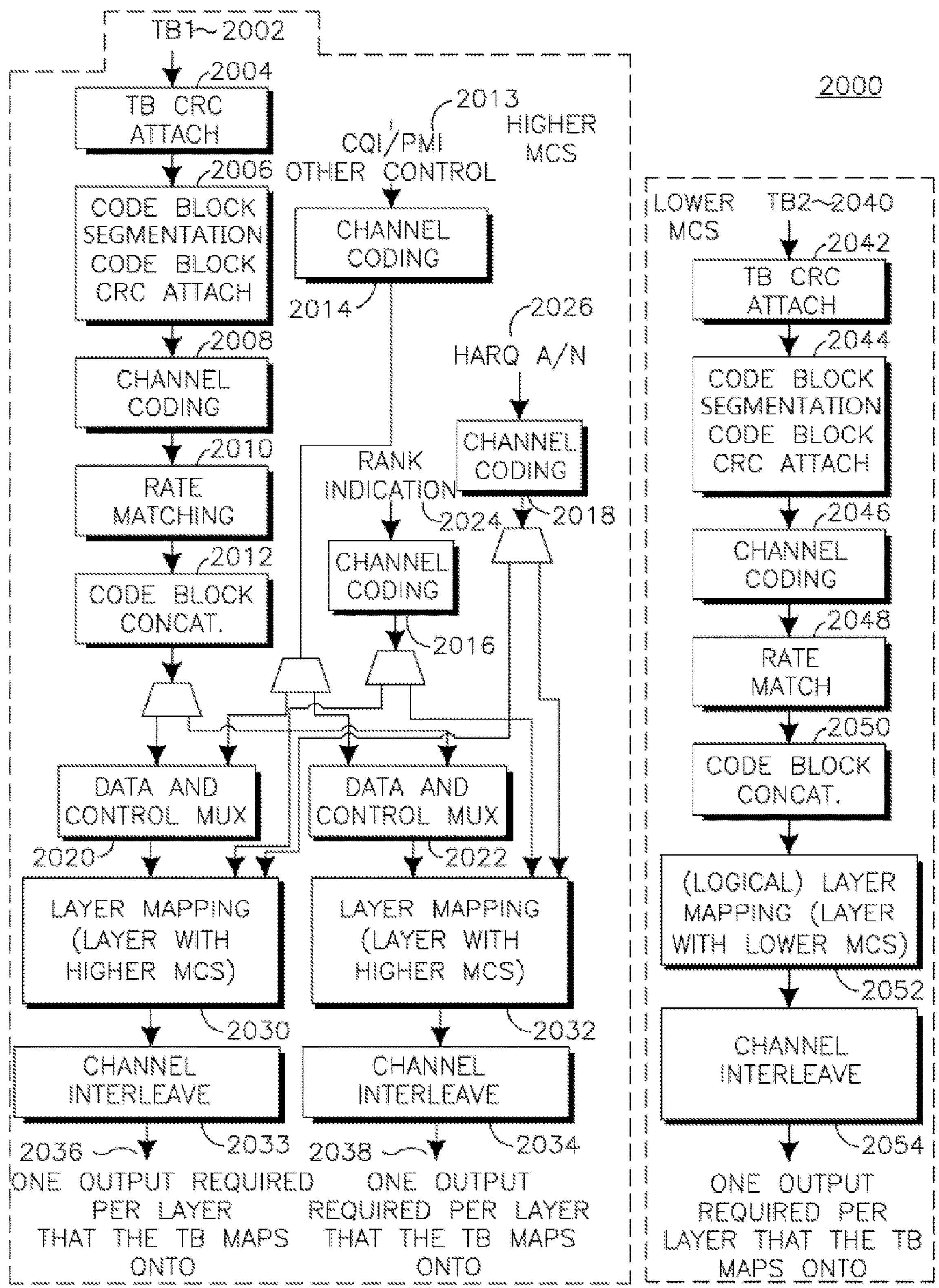
FIG. 20 is a block diagram of a method of UCI bit mapping in accordance with yet another embodiment.

FIG. 20 is a block diagram of a method of transmitting UCI (CQI/PMI, RI and HARQ A/N) bits 2000 in accordance with another embodiment. FIG. 20 shows a system using three (3) layers for three (3) or mores antennas and two (2) codewords, and UCI bits mapped to two (2) layers of the first codeword. The UCI bits are repeated across both layers of the first codeword. Or the UCI bits are split into two groups and the bits of each group are distributed respectively to a layer of a codeword with relatively higher MCS. The bit size of each group may be equal or alternatively determined based on SINR of the layers.

TB1 2002 is processed by a CRC attachment function 2004 and then a code block segmentation and code block CRC attachment function 2006. The processed TB1 bits are channel coded by a channel coding unit 2008, rate matched in a rate matching unit 2010 and concatenated in a code block concatenation unit 2012 and then split into two groups. Each group of the processed TB1 bits and the repeated CQI/PMI bits 2013 (or the CQI/PMI bits split to two groups) that has been channel coded in a channel coding unit 2014 are input in a first data and control multiplexer 2020 and a second data and control multiplexer 2022. The multiplexed bits, along with the repeated RI bits 2024 that have been channel coded in a third channel coding unit 2016, and HARQ ACK/NACK bits 2026 (or the channel coded RI bits and HARQ ACK/NACK bits split to two groups) that have been coded in a forth channel coding unit 2018 are then mapped to a layer with a relatively higher MCS in a first layer mapping unit 2030 and a second layer mapping unit 2032.

The mapped TB1 bits, CQI/PMI bits, RI bits and HARQ ACK/NACK bits are interleaved in a first and second channel interleaver unit 2033, 2034, and each layer output is sent to an antenna mapping unit (not pictured).

TB2 2040 is mapped to the second codeword which has only one layer and is processed by a CRC attach function 2042 and then a code block segmentation and code block CRC attachment function 2044. The processed TB2 bits are channel coded by a channel coding unit 2046, rate matched in a rate matching unit 2048 and concatenated in a code block concatenation unit 2050. The processed TB2 bits are mapped to a layer with a relatively lower MCS in a layer mapping unit 2052 and interleaved in a channel interleaver unit 2054. The processed TB2 bits, mapped to the second codeword, are then output to the antenna mapping unit (not pictured).

Figure 21:
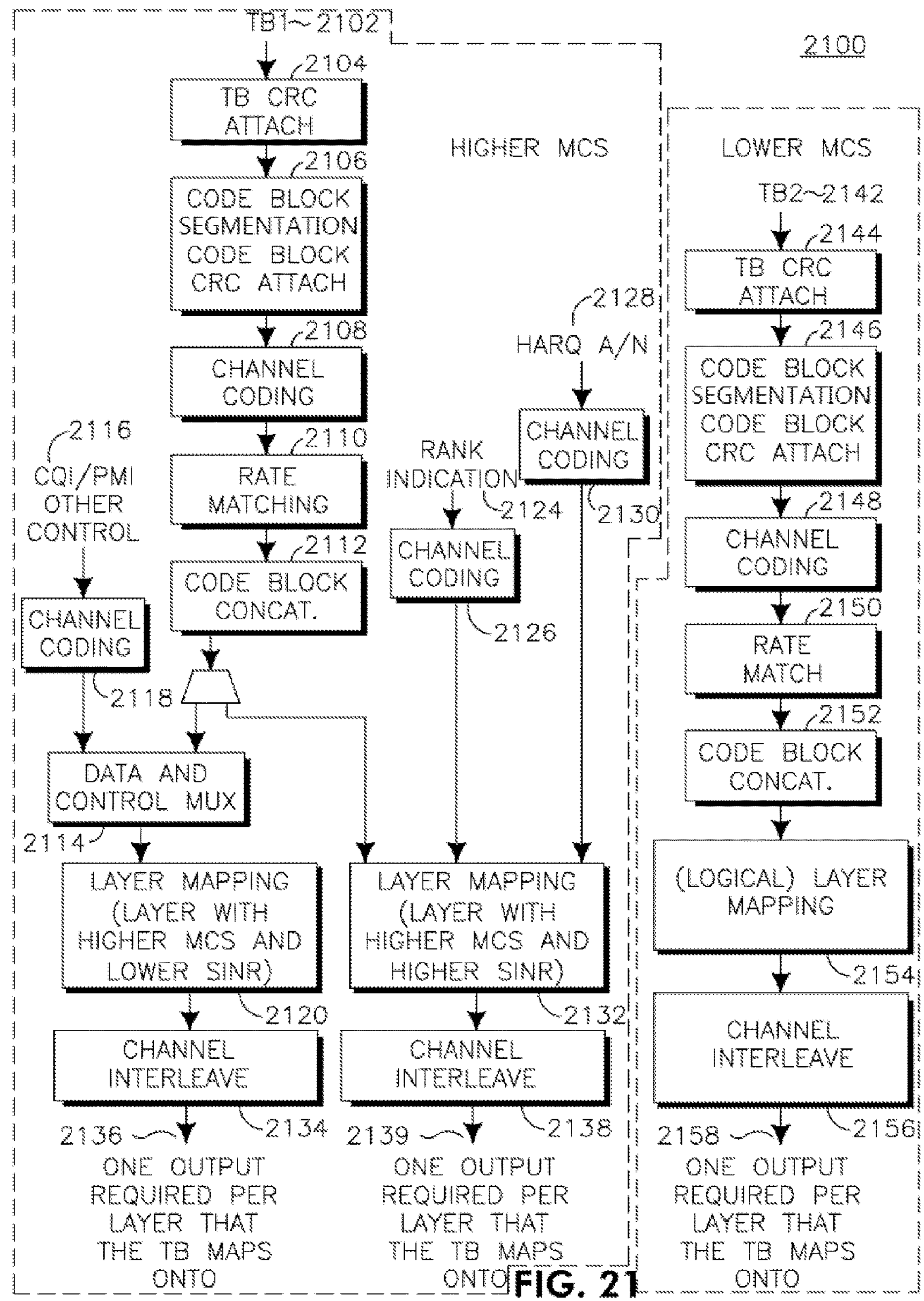
FIG. 21 is a block diagram of a method of UCI bit mapping in accordance with yet another embodiment.

FIG. 21 is a block diagram of a method of transmitting UCI bits 2100 in accordance with another embodiment. FIG. 21 shows a system using three (3) layers for 3 or more antennas, two (2) codewords and UCI bits mapped to the codeword with higher MCS. The codeword with the higher MCS is mapped to two (2) layers. The CQI/PMI bits are mapped to the layer with lower SINR in the codeword with higher MCS. The RI and ACK/NACK bits are mapped to the layer with the higher SINR in the codeword with higher MCS. Mapping the RI and ACK/NACK bits on the layer with higher SINR (in the codeword with higher MCS) increases the reception reliability of the RI and ACK/NACK bits.

As shown in FIG. 21, TB1 is processed by a CRC attachment function 2104 and then a code block segmentation and code block CRC attachment function 2106. The processed TB1 bits are channel coded by a channel coding unit 2108, rate matched in a rate matching unit 2110 and concatenated in a code block concatenation unit 2112. The processed TB1 bits are split into two (2) streams and then one stream input into a control and data multiplexer 2114 along with CQI/PMI bits 2116 that has been channel coded in a channel coding unit 2118. The multiplexed bits are then mapped to a layer with a relatively lower SINR in a codeword with relatively higher MCS in a first layer mapping unit 2120. RI bits 2124 are channel coded in a second channel coding unit 2126. HARQ ACK/NACK bits 2128 are channel coded in a third channel coding unit 2130. The channel coded RI bits and HARQ ACK/NACK bits and the other stream of the processed TB1 are mapped to the layer with a relatively higher SINR in the codeword with relatively higher MCS in a second layer mapping unit 2132. The mapped TB1 bits of the first group and the CQI/PMI bits are interleaved in a first channel interleaver unit 2134 and the single layer output is sent to a first antenna mapping unit 2136. The mapped TB1 bits of the second group and RI and HARQ ACK/NACK bits are interleaved in a second channel interleaver unit 2138 and the single layer output is sent to the antenna mapping unit (not pictured).

TB2 2142 is mapped to the second codeword and is processed by a CRC attachment function 2144 and then a code block segmentation and code block CRC attachment function 2146. The processed TB2 bits are channel coded by a channel coding unit 2148, rate matched in a rate matching unit 2150, and concatenated in a code block concatenation unit 2152. The processed TB2 bits are mapped to the layer of the second codeword with relatively lower MCS in a layer mapping unit 2154 and interleaved in a channel interleaver unit 2156. The processed TB2 bits are mapped to the second codeword are then output to the antenna mapping unit (not pictured).

Figure 22:
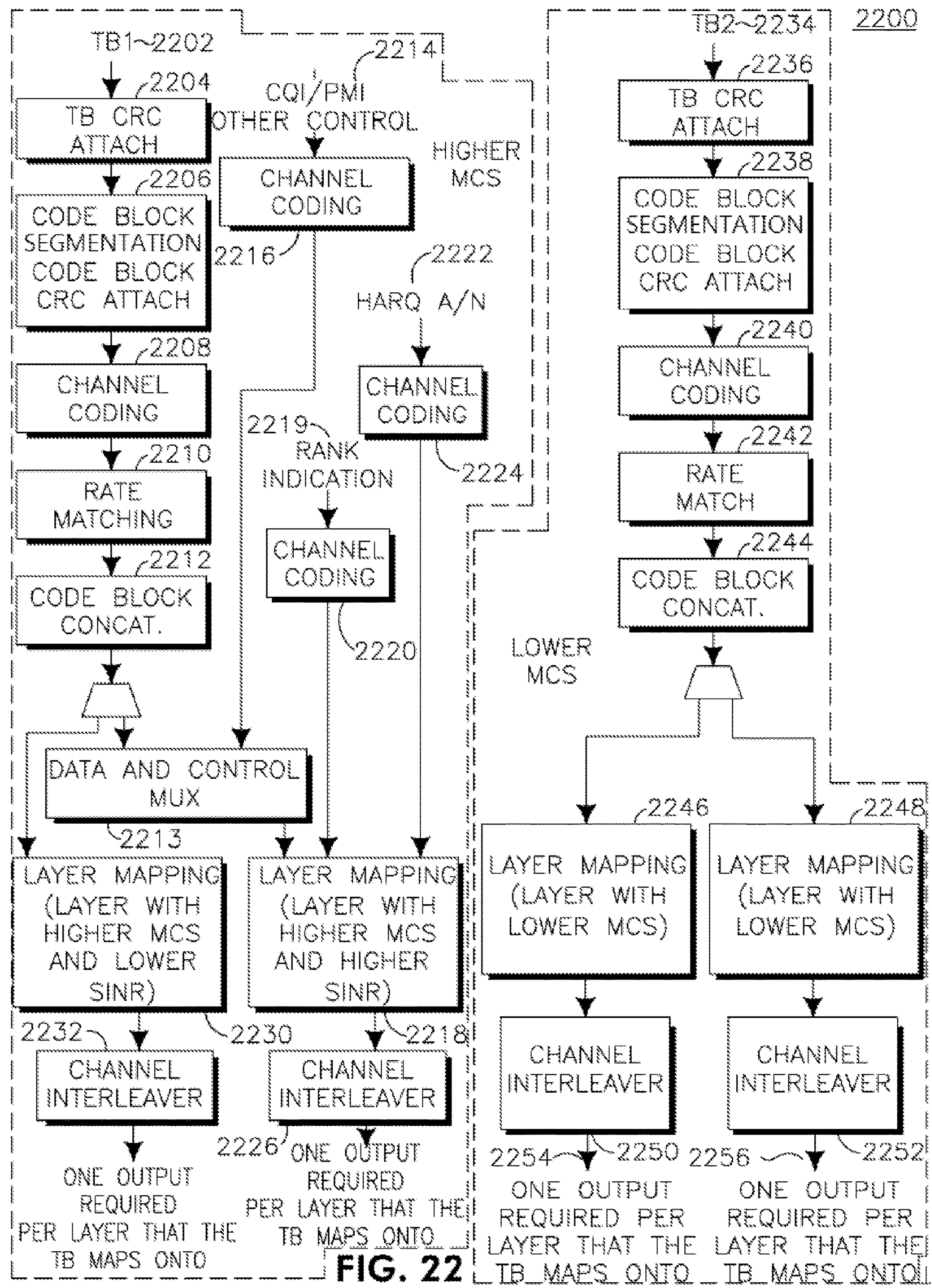
FIG. 22 is a block diagram of a method of UCI bit mapping in accordance with yet another embodiment.

FIG. 22 is a block diagram of a method of transmitting UCI bits 2200 in accordance with another embodiment. FIG. 22 shows a system using four (4) layers, i.e. rank four (4) for four or more antennas, two (2) codewords and UCI bits mapped to the layer with the higher MCS and SINR.

As shown in FIG. 22, TB1 is processed by a CRC attachment function 2204 and then a code block segmentation and code block CRC attachment function 2206. The processed TB1 bits are channel coded by a channel coding unit 2208, rate matched in a rate matching unit 2210 and concatenated in a code block concatenation unit 2212. The processed TB1 bits are split into two (2) streams and then one stream input into a control and data multiplexer 2213 along with CQI/PMI bits 2214 that has been channel coded in a channel coding unit 2216. The multiplexed bits are then mapped to a layer with a relatively higher MCS and highest SINR in a first layer mapping unit 2218. RI bits 2219 are channel coded in another channel coding unit 2220, and HARQ ACK/NACK bits 2222 are channel coded in yet another channel coding unit 2224. Channel coded RI bits and HARQ ACK/NACK bits are also mapped to the same layer with a relatively higher MCS and higher SINR in the first layer mapping unit 2218. The mapped TB1 bits, CQI/PMI bits, RI bits and HARQ ACK/NACK bits are interleaved in a channel interleaver unit 2226, and the single layer output is sent to the antenna mapping unit (not pictured). The bits of the other stream of processed TB1 are also mapped to a layer with higher MCS, but lower relative SINR in a second layer mapping unit 2230. The mapped bits are interleaved in a channel interleaver unit, and output to the antenna mapping unit (not pictured).

TB2 2234 is mapped to the second codeword and is processed by a CRC attachment function 2236 and then a code block segmentation and code block CRC attachment function 2238. The processed TB2 bits are channel coded by a channel coding unit 2240, rate matched in a rate matching unit 2242 and concatenated in a code block concatenation unit 2244. The processed TB2 bits are split into two groups. The bits of both groups are mapped respectively to two (2) layers with lower MCS in respective layer mapping units 2246, 2248, and interleaved in a channel interleaver unit 2250, 2252. The processed TB2 bits mapped to the second codeword, are then output to the antenna mapping unit (not pictured).

Figure 23:
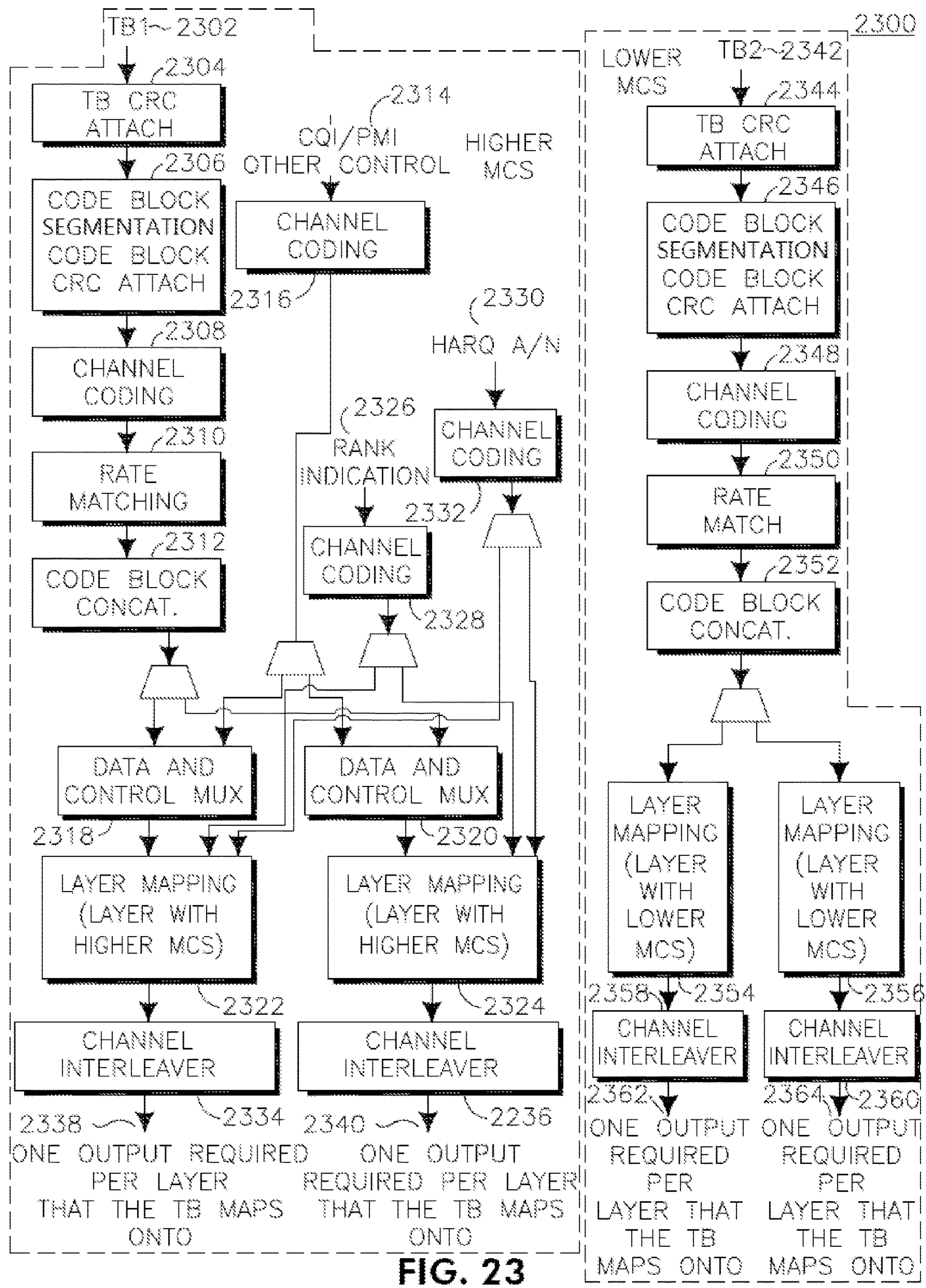
FIG. 23 is a block diagram of a method of UCI bit mapping in accordance with yet another embodiment.

FIG. 23 is a block diagram of a method of transmitting UCI (CQI/PMI, RI and HARQ A/N) bits 2300 in accordance with another embodiment. FIG. 23 shows a system using two (2) codewords, four (4) layers, i.e. rank four (4) for four (4) or more antennas and UCI bits mapped to one (1) codeword and two (2) layers. The UCI bits are repeated and mapped to both layers of the codeword with relatively higher MCS. Or the UCI bits are split into two streams and the bits of each stream are distributed respectively to a layer of a codeword with higher MCS. The streams may be equal length or alternatively their lengths are determined based on SINR of the layers.

As shown in FIG. 23, TB1 2302 is processed by a CRC attachment function 2304 and then a code block segmentation and code block CRC attachment function 2306. The processed TB1 bits are channel coded by a channel coding unit 2308, rate matched in a rate matching unit 2310 and concatenated in a code block concatenation unit 2312 and then split into two groups. Each group of the processed TB1 bits and the repeated CQI/PMI bits 2314 (or the CQI/PMI bits split to two groups) that has been channel coded in a channel coding unit 2316 are then input into a first control and data multiplexer 2318 and a second control and data multiplexer 2320. The multiplexed bits are then mapped to two layers with a relatively higher MCS in a first layer mapping unit 2322 and a second layer mapping unit 2324. RI bits 2326 are channel coded in another channel coding unit 2328, and HARQ ACK/NACK bits 2330 are channel coded in yet another channel coder 2332. The channel coded RI bits and HARQ ACK/NACK bits are also mapped to each layer with a relatively higher MCS in the first and second layer mapping unit 2322, 2324. The mapped TB1 bits, UCI bits, RI bits and HARQ ACK/NACK bits are interleaved in a first interleaving unit 2334 and a second channel interleaver units 2336, and the output of each channel interleaver unit is output to a to the antenna mapping units (not pictured).

TB2 2342 is mapped to the second codeword and is processed by a CRC attachment function 2344 and then a code block segmentation and code block CRC attachment function 2346. The processed TB2 bits are channel coded by a channel coding unit 2348, rate matched in a ratematching unit 2350 and concatenated in a code block concatenation unit 2352. The processed TB2 bits are split into two (2) groups and then mapped to layers with lower relative MCS in a first and second layer mapping unit respectively 2354, 2356 and interleaved in a first and second channel interleaver unit 2358, 2360. The processed TB2 bits, mapped to the second codeword, output to the antenna mapping unit (not pictured).

Figure 24:
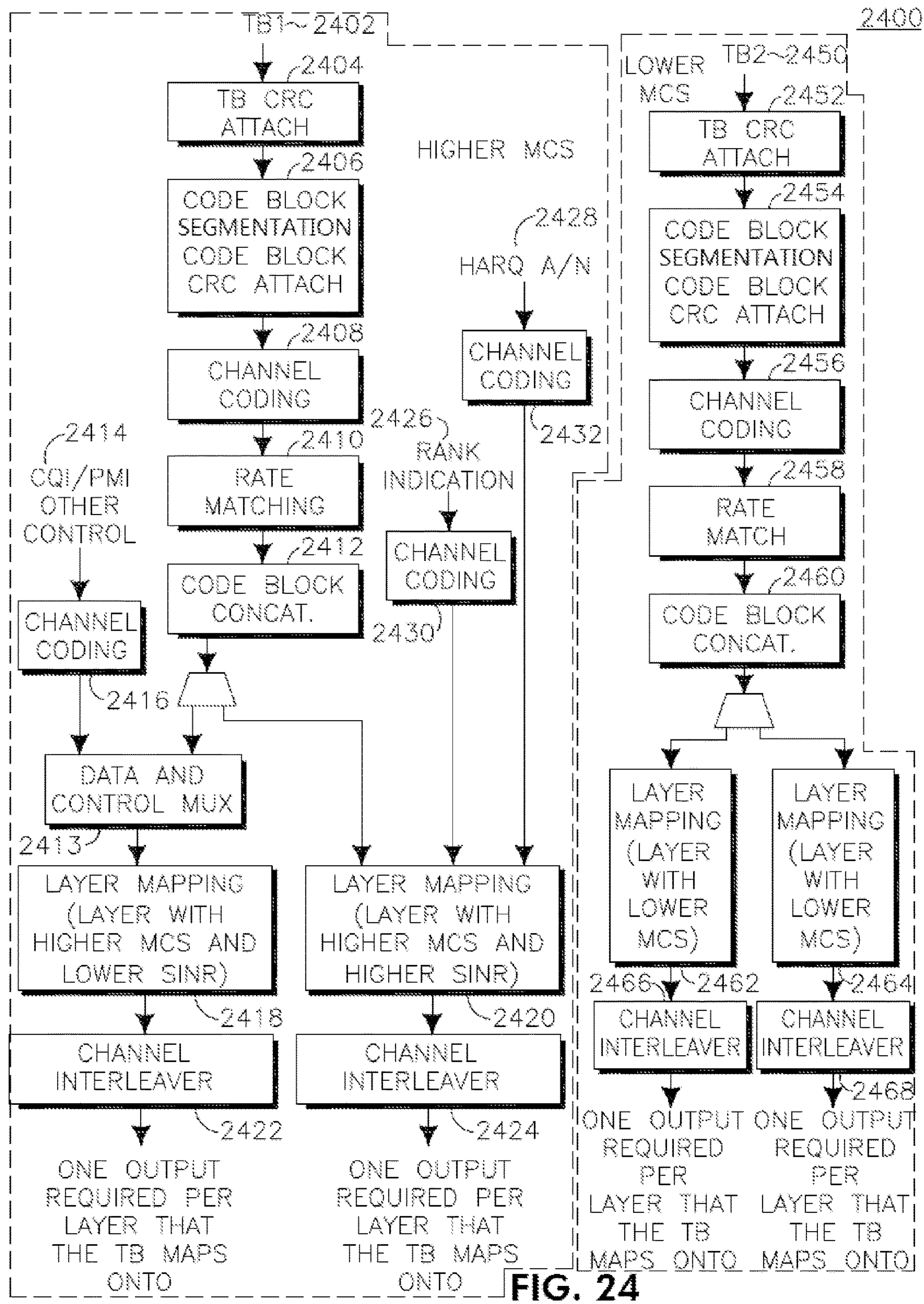
FIG. 24 is a block diagram of a method of UCI bit mapping in accordance with yet another embodiment.

FIG. 24 is a block diagram of a method of transmitting UCI bits in accordance with another embodiment. FIG. 24 shows a system using four (4) layers for four (4) or more antennas, two (2) codewords and UCI bits split between two (2) layers of the codeword with the highest MCS. The CQI/PMI bits are mapped to a first layer with lower SINR. The RI bits and the ACK/NACK bits are mapped to a second layer with higher SINR. The data bits of TB are split into two (2) groups and mapped to both layers. The data bits and RI and HARQ A/N of control bits may be processed with different precoding schemes.

As shown in FIG. 24, TB1 2402 is processed by a CRC attachment function 2404 and then a code block segmentation and code block CRC attachment function 2406. The processed TB1 bits are channel coded by a channel coding unit 2408, rate matched in a rate matching unit 2410 and concatenated in a code block concatenation unit 2412. The processed TB1 bits are split into two (2) groups and the bits of a group input into a control and data multiplexer 2413 along with CQI/PMI bits 2414 that has been channel coded in a channel coding unit 2416. The multiplexed bits are then mapped to a layer with a relatively higher MCS and lower SINR in a first layer mapping unit 2418. RI bits 2426 and HARQ ACK/NACK bits 2428 that have been channel coded in other channel coders 2430,2432 are also mapped, with processed TB1 bits of the other group, to a layer with a relatively higher MCS but higher SINR in a second layer mapping unit 2420. The mapped TB1 bits of the first group and CQI/PMI bits are interleaved in a first channel interleaver unit 2422. The mapped TB1 bits of the second group with RI and HARQ ACK/NACK bits are interleaved in a second channel interleaver unit 2424. The output of each channel interleaver 2422, 2424 is sent to the antenna mapping unit (not pictured).

TB2 2450 is mapped to the second codeword and is processed by a CRC attachment function 2452 and then a code block segmentation and code block CRC attachment function 2454. The processed TB2 bits are channel coded by a channel coding unit 2456, rate matched in a rate matching unit 2458 and concatenated in a code block concatenation unit 2460. The processed TB2 bits are split into two (2) groups and layer mapped in a first layer mapping unit 2462 and second layer mapping unit 2464 to two layers with lower MCS and interleaved in a first interleaving unit 2466 and a second channel interleaver unit 2468. The interleaved TB2 bits are output to the antenna mapping unit (not pictured).

Figure 25:
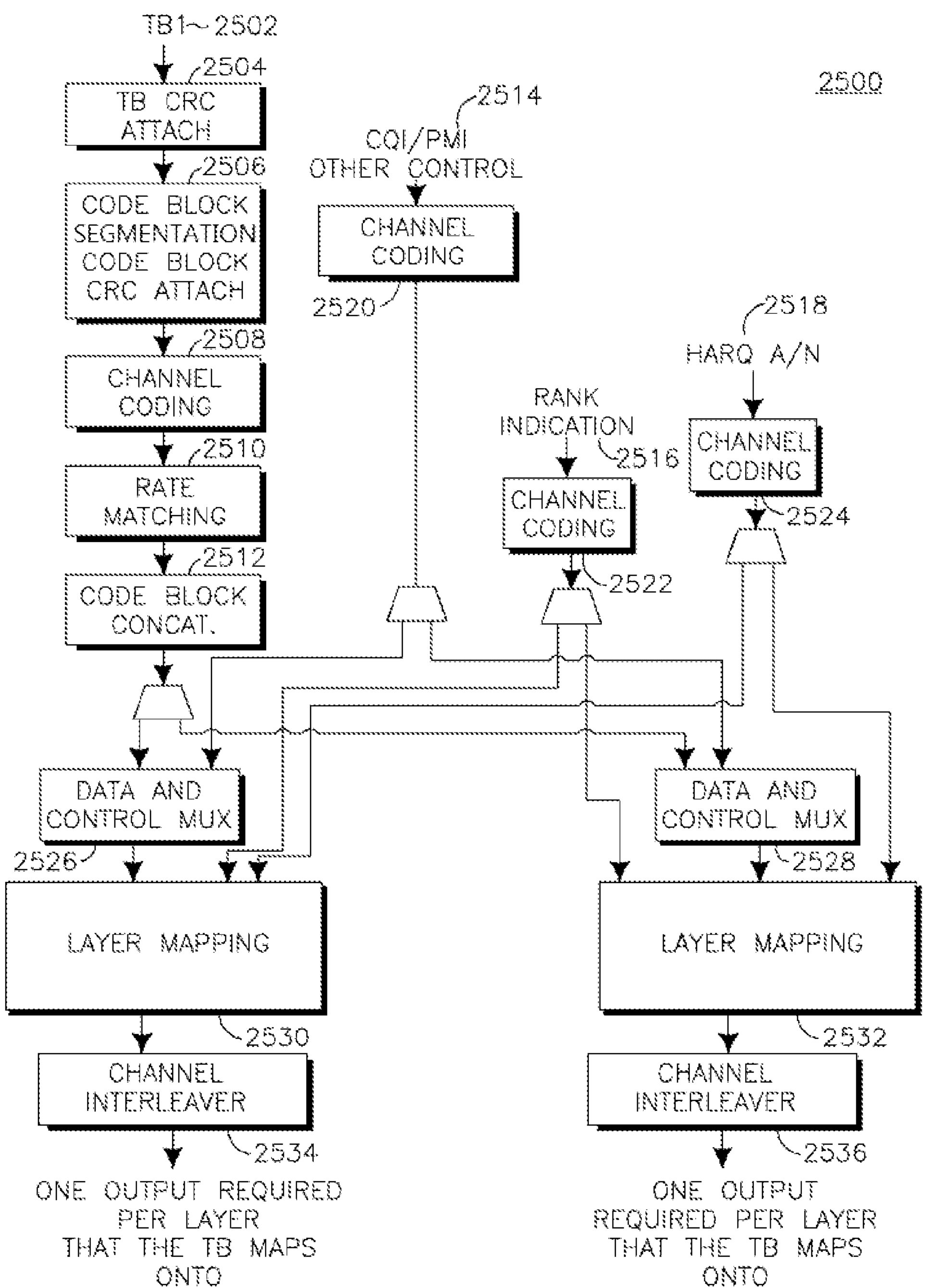
FIG. 25 is a block diagram of a method of UCI bit mapping in accordance with yet another embodiment.

FIG. 25 is a block diagram of a method 2500 of transmitting UCI bits in accordance with another embodiment. FIG. 25 shows a system using two (2) layers, i.e. rank 2 for 2 or more antennas, one (1) codeword and UCI bits mapped across two layers. The UCI bits are repeated or distributed across all layers and all codewords. The distribution scheme may use an equal amount of control bits per codeword or per layer, or by allocating the number of control bits to each layer or codeword based on a parameter, such as MCS, transport block size or SINR, for example.

As shown in FIG. 25, TB1 2502 is processed by a CRC attachment function 2504 and then a code block segmentation and code block CRC attachment function 2506. The processed TB1 bits are channel coded by a channel coding unit 2508, rate matched in a rate matching unit 2510, and concatenated in a code block concatenation unit 2512. UCI bits 2514, 2516, 2518 are channel coded in a channel coding unit respectively 2520, 2522, 2524. The processed TB1 bits are split into two (2) streams. UCI bits are repeated or split into two (2) streams respectively. The bits of a stream of TB1 input into a first and second control and data multiplexer 2526, 2528 along with a stream of CQI/PMI bits either repeated or split. The multiplexed bits are then mapped to two layers with coded RI bits and coded HARQ ACK/NACK bits either repeated or split in a first and second layer mapping unit 2530, 2532. The mapped TB1 bits, CQI/PMI bits, RI bits and HARQ ACK/NACK bits are processed in a first and second channel interleaver unit 2534, 2536 and then sent to the antenna mapping unit (not pictured).

Figure 26:
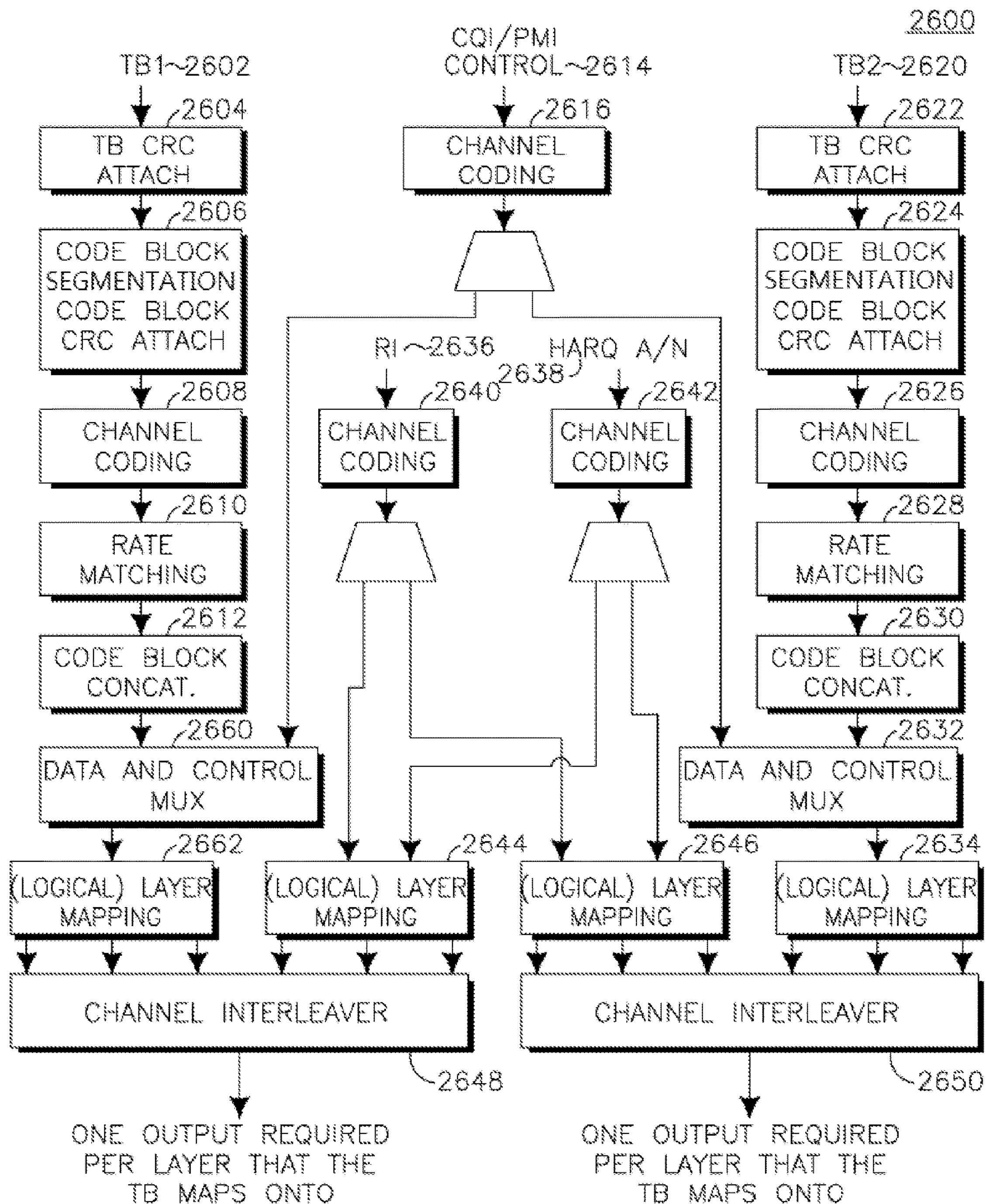
FIG. 26 is a block diagram of a method of UCI bit mapping in accordance with yet another embodiment.

FIG. 26 is a block diagram of a method of transmitting UCI bits 2600 in accordance with another embodiment. FIG. 26 shows a system using two (2) layers, i.e. rank two (2) for two (2) or more antennas, two (2) codewords and UCI bits mapped across all layers.

As shown in FIG. 26 TB1 2602 is processed by a CRC attachment function 2604 and then a code block segmentation and code block CRC attachment function 2606. The processed TB1 bits are channel coded by a channel coding unit 2608, rate matched in a rate matching unit 2610 and concatenated in a code block concatenation unit 2612. CQI/PMI bits 2614 are channel coded in a channel coding unit 2616 and split over two (2) streams. The processed TB1 bits are then input into a control and data multiplexer 2660 along with a stream (first) of CQI/PMI bits. The multiplexed bits are then mapped to a layer in a first layer mapping unit 2662.

TB2 2620 is mapped to the second codeword and is processed by a CRC attachment function 2622 and then a code block segmentation and code block CRC attach function 2624. The processed TB2 bits are channel coded by a channel coding unit 2626, rate matched in a rate matching unit 2628 and concatenated in a code block concatenation unit 2630. The processed TB2 bits are multiplexed with the other (second) stream of CQI/PMI bits in a second data and control multiplexer 2632. The multiplexed bits are mapped in a second layer mapping unit 2634.

RI bits 2636 and HARQ ACK/NACK bits 2638 are channel coded 2640, 2642, split over two (2) streams, and respectively mapped to two layers in a third and fourth layer mapping unit 2644, 2646. The mapped TB1 bits, a first stream of CQI/PMI bits, a first stream of RI bits and a first stream of HARQ ACK/NACK bits are interleaved in a first channel interleaver unit 2648, and output to the antenna mapping unit (not pictured). The mapped TB2 bits, a second stream of CQI/PMI bits, a second stream of RI bits and a second stream of HARQ ACK/NACK bits are interleaved in a second channel interleaver unit 2650, and output to the antenna mapping unit (not pictured).

Figure 27:
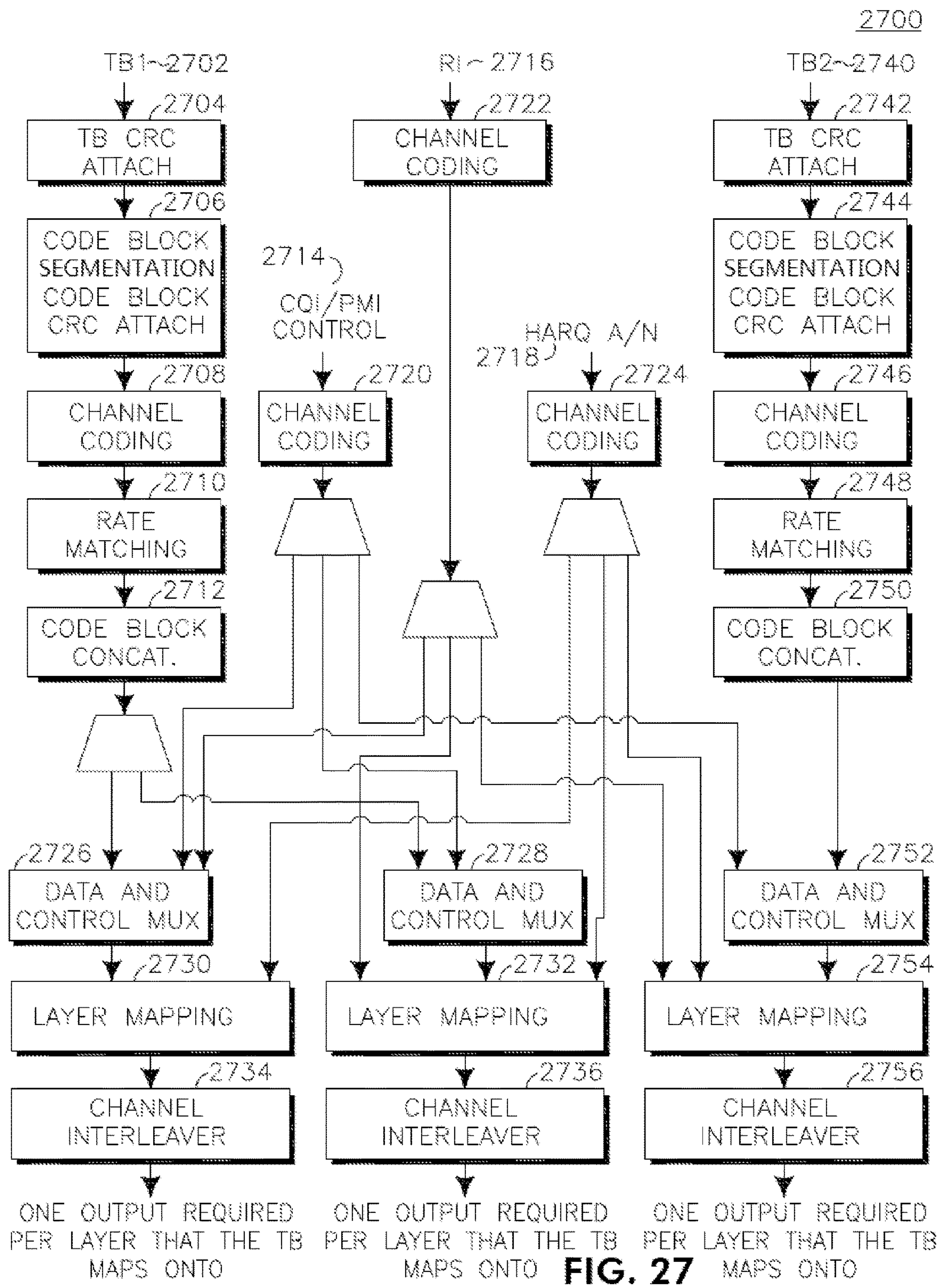
FIG. 27 is a block diagram of a method of UCI bit mapping in accordance with yet another embodiment.

FIG. 27 is a block diagram of a method of transmitting UCI bits 2700 in accordance with another embodiment. FIG. 27 shows a system with three (3) layers, i.e. rank three (3) for three (3) or more antennas, two (2) codewords and UCI bits mapped over three layers.

As shown in FIG. 27, TB1 2702 is processed by a CRC attach function 2704 and then a code block segmentation and code block CRC attachment function 2706. The processed TB1 bits are channel coded by a channel coding unit 2708, rate matched in a rate matching unit 2710 and concatenated in a code block concatenation unit 2712. The processed TB1 bits are split into two (2) streams. UCI bits 2714, 2716, 2718 are channel coded in a channel coding unit respectively 2720, 2722, 2724 and repeated or split into three (3) streams respectively. The bits of two groups of TB1 input into a first and a second control and data multiplexer 2726, 2728 along with two groups of CQI/PMI bits. The multiplexed bits are then mapped, along with two streams of coded RI bits and coded HARQ ACK/NACK bits to two (2) layers in a first and second layer mapping unit 2730, 2732. The output of each layer mapping unit is processed by a channel interleaving unit 2734, 2736, then sent to the antenna mapping unit (not pictured).

TB2 2740 is mapped to the second codeword and is processed by a CRC attachment function 2742 and then a code block segmentation and code block CRC attachment function 2744. The processed TB2 bits are channel coded by a channel coding unit 2746, rate matched in a rate matching unit 2748 and concatenated in a code block concatenation unit 2750. The processed TB2 bits are multiplexed with the remaining/third stream of coded CQI/PMI bits in a third data and control multiplexer 2752. The multiplexed TB2 and CQI/PMI bits are mapped in a layer mapping unit 2754 with the remaining/third stream of coded RI bits and HARQ ACK/NACK bits. The output of each layer mapping unit is processed by a channel interleaving unit 2756, then sent to the antenna mapping unit (not pictured).

Figure 28:
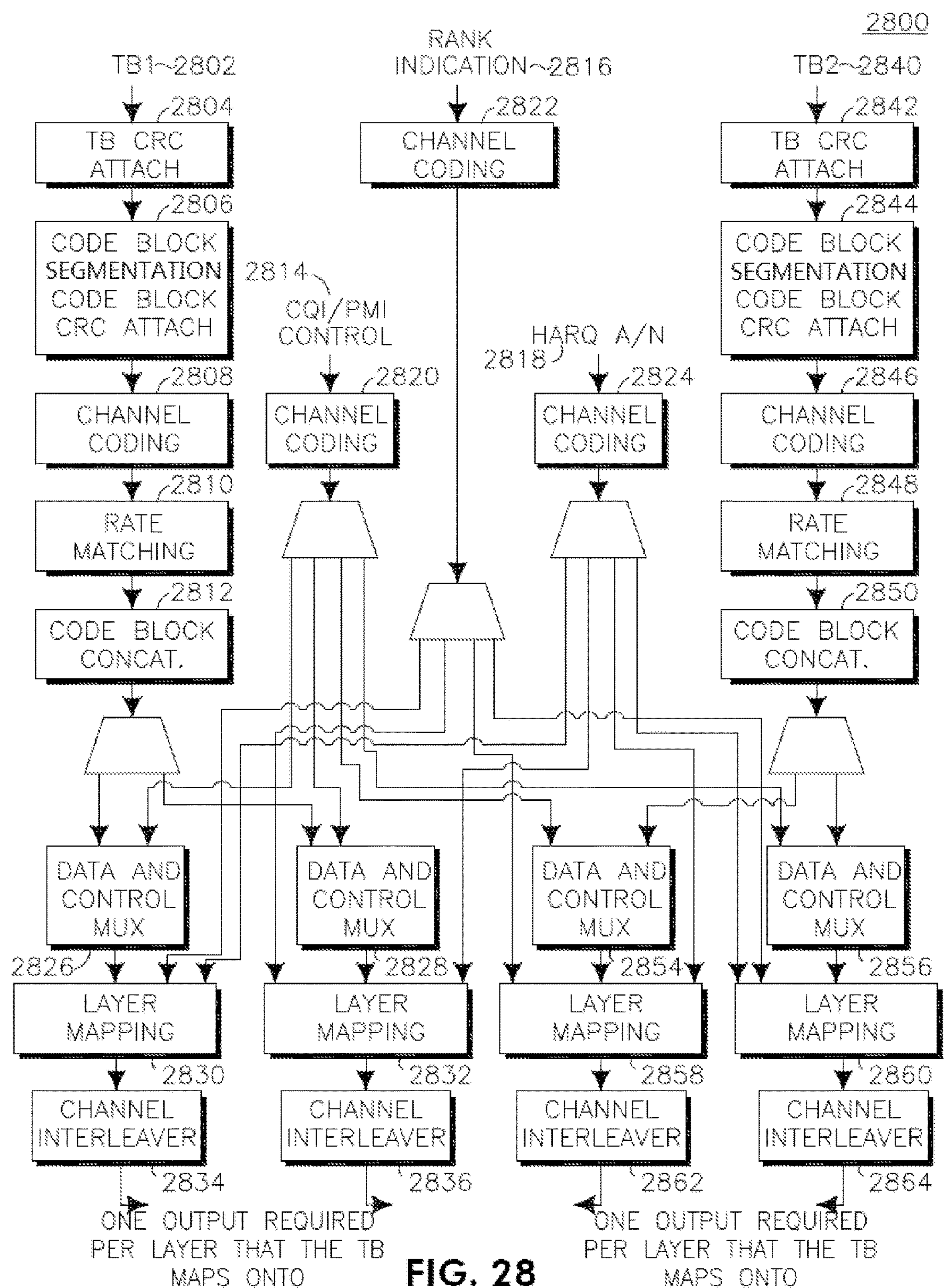
FIG. 28 is a block diagram of a method of UCI bit mapping in accordance with yet another embodiment.

FIG. 28 is a block diagram of a method of transmitting UCI bits 2800 in accordance with another embodiment. FIG. 28 shows a system with four (4) layers i.e. rank four (4) for 4 or more antennas, two (2) codewords and UCI bits mapped over four layers.

As shown in FIG. 28, TB1 2802 is processed by a CRC attach function 2804 and then a code block segmentation and code block CRC attachment function 2806. The processed TB1 bits are channel coded by a channel coding unit 2808, rate matched in a rate matching unit 2810 and concatenated in a code block concatenation unit 2812. The processed TB1 bits are split into two (2) streams. UCI bits 2814, 2816, 2818 are channel coded in a channel coding unit respectively 2820, 2822, 2824 and repeated or split into four (4) streams respectively. The bits of two streams of TB1 are input into a first and a second control and data multiplexer 2826, 2828 along with two streams of CQI/PMI bits. Each multiplexed bit stream is then mapped, along with one stream of coded RI bits and one stream of coded HARQ ACK/NACK bits to one of a first and second layer in a layer mapping units 2830, 2832. The output of each of the first and second layer mapping units 2830, 2832 is processed by a respective channel interleaving unit 2834, 2836, and then sent to an antenna mapping unit (not pictured).

TB2 2840 is mapped to the second codeword and is processed by a CRC attachment function 2842 and then a code block segmentation and code block CRC attachment function 2844. The processed TB2 bits are channel coded by a channel coding unit 2846, rate matched in a rate matching unit 2848 and concatenated in a code block concatenation unit 2850. The processed TB2 bits are split into two (2) streams. The processed TB2 bits are then input into a third and a fourth control and data multiplexer 2854, 2856 along with two remaining streams of CQI/PMI bits. Each multiplexed bit stream is then mapped, along with one stream of coded RI bits and one stream of coded HARQ ACK/NACK bits to a layer in a third and fourth layer mapping unit 2858, 2860. The output of each layer mapping unit is processed by a third and fourth channel interleaving unit 2862, 2864, and then sent to an antenna mapping unit (not pictured).

When control bits are multiplexed with data bits, the control bits may be transmitted using a different MIMO mode than the data bits. This may occur even though the bits are transmitted in one subframe. For example, the control bits may be transmitted using transmit diversity, while a precoding MIMO mode is used for the data bits. The WTRU may receive information as to which MIMO mode to use for which type of bits from an eNodeB, in, for example, a Layer 1 (L1) or Layer (2) message.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of operation of an evolved Node B (eNB), the method comprising:

transmitting information to a wireless transmit receive unit (WTRU); and receiving, from the WTRU, at least a first layer of a plurality of layers, wherein the at least first layer includes at least channel quality indicator (CQI) bits multiplexed with data bits of a first transport block, wherein the first transport block has a first modulation and coding scheme (MCS), and further wherein the CQI bits are received via the first layer based on the first MCS of the first transport block; and receiving, from the WTRU, at least a second layer of the plurality of layers, wherein the at least second layer includes at least rank indicator (RI) bits, hybrid automatic repeat request (HARQ) acknowledge/non-acknowledge (ACK/NACK) bits, and a second transport block, wherein the CQI bits are not received via the second layer.

2. The method of claim 1, wherein the RI bits and the HARQ ACK/NACK bits are received via all layers of the plurality of layers.

3. The method of claim 1, wherein the first transport block has a highest MCS of at least the first transport block and the second transport block.

4. The method of claim 1, wherein uplink control information (UCI) includes the CQI bits, the RI bits, and the HARQ ACK/NACK bits, and of the UCI, only the CQI bits are multiplexed with the data bits of the first transport block.

5. The method of claim 4, wherein the UCI is received via an uplink transmission using transmit diversity.

6. The method of claim 5, wherein at least the data bits of the first transport block are received via an uplink transmission using spatial multiplexing.

7. The method of claim 4, wherein the UCI includes coded UCI bits.

8. The method of claim 1, wherein the data bits of the first transport block are coded data bits.

9. The method of claim 1, wherein the first transport block and the second transport block are received via an uplink shared channel.

10. The method of claim 1, wherein the first transport block is received via two layers.

11. An evolved Node B (eNB) comprising:

a transmitter configured to transmit information to a wireless transmit receive unit (WTRU); and a receiver configured to:

receive, from the WTRU, at least a first layer of a plurality of layers, wherein the at least first layer includes at least channel quality indicator (CQI) bits multiplexed with data bits of a first transport block, wherein the first transport block has a first modulation and coding scheme (MCS), and further wherein the CQI bits are received via the first layer based on the first MCS of the first transport block; and receive, from the WTRU, at least a second layer of the plurality of layers, wherein the at least second layer includes at least rank indicator (RI) bits, hybrid automatic repeat request (HARQ) acknowledge/non-acknowledge (ACK/NACK) bits, and a second transport block, wherein the CQI bits are not received via the second layer.

12. The eNB of claim 11, wherein the receiver is further configured to receive the RI bits and the HARQ ACK/NACK bits via all layers of the plurality of layers.

13. The eNB of claim 11, wherein the first transport block has a highest MCS of at least the first transport block and the second transport block.

14. The eNB of claim 11, wherein uplink control information (UCI) includes the CQI bits, the RI bits, and the HARQ ACK/NACK bits, and of the UCI, only the CQI bits are multiplexed with the data bits of the first transport block.

15. The eNB of claim 14, wherein the receiver is further configured to receive the UCI via an uplink transmission that uses transmit diversity.

16. The eNB of claim 15, wherein the receiver is further configured to receive at least the data bits of the first transport block via an uplink transmission that uses spatial multiplexing.

17. The eNB of claim 14, wherein the UCI includes coded UCI bits.

18. The eNB of claim 11, wherein the data bits of the first transport block are coded data bits.

19. The eNB of claim 11, wherein the receiver is further configured to receive the first transport block and the second transport block via an uplink shared channel.

20. The eNB of claim 11, wherein the receiver is further configured to receive the first transport block via two layers.

* * * * *